US012658093B2

(12) United States Patent
Lee et al.

(10) Patent No.: US 12,658,093 B2
(45) Date of Patent: Jun. 16, 2026

(54) DISPLAY DRIVING DEVICE, SOURCE DRIVER, AND DISPLAY DEVICE INCLUDING THEREOF

(71) Applicant: SAMSUNG ELECTRONICS CO., LTD., Suwon-si (KR)

(72) Inventors: Donghan Lee, Suwon-si (KR); Jinwoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/609,782

(22) Filed: Mar. 19, 2024

(65) Prior Publication Data

US 2025/0078717 A1 Mar. 6, 2025

(30) Foreign Application Priority Data

Sep. 5, 2023 (KR) ........................ 10-2023-0117900

(51) Int. Cl.
*G09G 3/20* (2006.01)

(52) U.S. Cl.
CPC ... *G09G 3/2092* (2013.01); *G09G 2300/0828* (2013.01); *G09G 2310/0289* (2013.01); *G09G 2310/0291* (2013.01); *G09G 2310/08* (2013.01)

(58) Field of Classification Search
CPC ......... G09G 3/2092; G09G 2300/0828; G09G 2310/0289; G09G 2310/0291; G09G 2310/08; G09G 3/3275; G09G 3/3208; G09G 2310/0243; G09G 2310/0264; G09G 2310/027; G09G 2320/0233; G09G 2320/0276; G09G 2320/0673; G09G 2340/04; G09G 3/3685; H03M 1/001
See application file for complete search history.

(56) References Cited

U.S. PATENT DOCUMENTS

| | | | |
|---|---|---|---|
| 6,930,518 B2 | 8/2005 | Kim et al. | |
| 10,217,395 B2 | 2/2019 | Ha | |
| 10,229,634 B2 | 3/2019 | Zhang et al. | |
| 11,114,140 B1 * | 9/2021 | Chern | G11C 7/12 |
| 11,410,594 B1 * | 8/2022 | Chen | G09G 3/2007 |
| 2004/0160262 A1 | 8/2004 | Kim et al. | |
| 2005/0083258 A1 * | 4/2005 | Choi | G09G 3/2803 345/60 |
| 2006/0114209 A1 | 6/2006 | Kim et al. | |

(Continued)

FOREIGN PATENT DOCUMENTS

| | | |
|---|---|---|
| JP | 2005-309284 | 11/2005 |
| KR | 10-0223594 | 10/1999 |

(Continued)

*Primary Examiner* — Jose R Soto Lopez
(74) *Attorney, Agent, or Firm* — Fish & Richardson P.C.

(57) ABSTRACT

An example display driving device includes a level shifter and a digital-analog converter (DAC). The level shifter is configured to receive image data and a bias control signal, to generate decoded image data including a plurality of bits by level shifting the image data, and to control an output bias current of the decoded image data based on the bias control signal. The DAC is configured to receive the decoded image data and a plurality of gamma voltages, to select one gamma voltage of the plurality of gamma voltages based on the decoded image data, and to output the selected gamma voltage.

19 Claims, 20 Drawing Sheets

(56) References Cited

U.S. PATENT DOCUMENTS

| | | | | |
|---|---|---|---|---|
| 2011/0050746 | A1* | 3/2011 | Tsuchi | G09G 3/20 327/333 |
| 2011/0193848 | A1* | 8/2011 | Kojima | H03K 19/018571 327/108 |
| 2012/0188216 | A1* | 7/2012 | Gu | G09G 3/3225 345/204 |
| 2016/0093270 | A1* | 3/2016 | Lee | G09G 3/3688 345/82 |
| 2019/0012981 | A1* | 1/2019 | Kumar L S | H04L 69/18 |
| 2019/0213958 | A1* | 7/2019 | Cho | G09G 3/3266 |
| 2022/0005394 | A1* | 1/2022 | Kim | G05F 3/24 |
| 2023/0010045 | A1* | 1/2023 | Tsuchi | G09G 3/3685 |
| 2024/0242651 | A1* | 7/2024 | Tsuchi | G09G 3/20 |

FOREIGN PATENT DOCUMENTS

| | | |
|---|---|---|
| KR | 10-0518558 | 10/2005 |
| KR | 10-2020-0046645 | 5/2020 |

* cited by examiner

1300

DISPLAY DRIVING DEVICE, SOURCE DRIVER, AND DISPLAY DEVICE INCLUDING THEREOF

CROSS-REFERENCE TO RELATED APPLICATION

This application claims priority to and the benefit of Korean Patent Application No. 10-2023-0117900, filed in the Korean Intellectual Property Office on Sep. 5, 2023, the entire disclosure of which is incorporated herein by reference.

BACKGROUND

In general, a display panel displays images to provide various visual information to a user. The display panel includes a plurality of pixels, and each of the pixels expresses light of a certain brightness to display an image. A display driver integrated circuit (DDI) is used to drive pixels.

As a number of bits of data representing gray levels increases, a number of level shifters required for one channel may increase, and as a number of DDI channels increases to drive a high-resolution display panel, a number of DDI level shifters operating together may increase for a short time. As multiple level shifters operate together for a short time, a level of peak current may increase. Ground bouncing, which indicates a temporary increase in ground voltage due to a high level of peak current, may affect adjacent circuits, modules, and interfaces.

SUMMARY

The present disclosure relates to display driving devices, including a display driving device that generates a peak current of a low level and a display driving device that displays a high-resolution image with high gray expression, source drivers, and display devices including the same.

In general, according to some aspects, a display driving device includes: a level shifter configured to receive image data and a bias control signal, to generate decoded data including a plurality of bits by level shifting the image data, and to control an output bias current of the decoded image data based on the bias control signal; and a digital-analog converter (DAC) configured to receive the decoded image data and a plurality of gamma voltages, to select one of the gamma voltages based on the decoded image data, and to output the selected gamma voltage.

In general, according to some aspects, a source driver includes: a plurality of amplifier areas each including a level shifter configured to output a plurality of bits of decoded image data, a digital-analog converter (DAC) configured to select one of a plurality of gamma voltages based on the decoded image data, and an amplifier configured to output a data signal obtained by amplifying the selected gamma voltage to a corresponding source line among a plurality of source lines; and a source driver including a bias circuit configured to generate a bias control signal that limits output bias currents of level shifters included in each of the amplifier areas.

In general, according to some aspects, a display device includes: a pixel array configured to include a plurality of pixels; a timing controller configured to receive an image signal and a driving control signal from an outside, to generate a plurality of image data by dividing the image signal, and to generate a bias start signal based on the driving control signal; a plurality of amplifier areas configured to receive the image data and a bias control signal, generate decoded image data by level shifting the image data, control a level of an output bias current of the decoded image data based on a level of the bias control signal, receive the decoded image data and a plurality of gamma voltages, select one of the gamma voltages based on the decoded image data, and output the selected gamma voltage; and a bias circuit configured to receive a bias start signal that controls the bias control signal to be outputted at a first level, and to generate the bias control signal at a second level that different from the first level with reference to data stored in an one-time programmable (OTP) memory.

DETAILED DESCRIPTION

In the following detailed description, certain implementations of the present disclosure have been shown and described, by way of illustration. As those skilled in the art would realize, the described implementations may be modified in various different ways, all without departing from the spirit or scope of the present disclosure.

Figure 1:
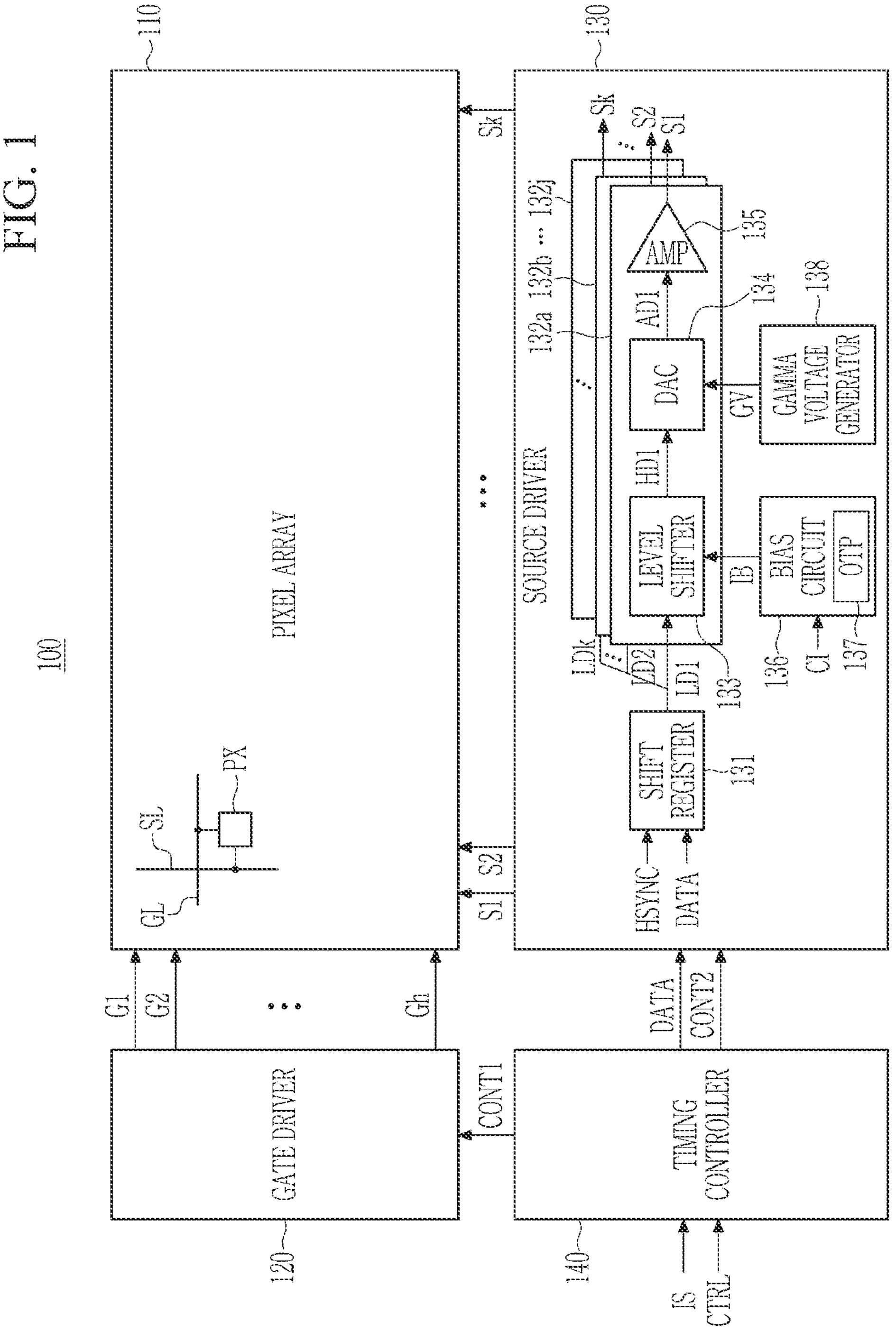
FIG. 1 illustrates an example block diagram of a display device.

FIG. 1 illustrates an example block diagram of a display device.

Referring to FIG. 1, the display device 100 includes a pixel array 110, a gate driver 120, a source driver 130, and a timing controller 140.

A plurality of pixels PX for displaying an image may be positioned in the pixel array 110. The pixels PX each may be connected to a corresponding source line SL among a plurality of source lines and a corresponding gate line GL among a plurality of gate lines. The pixel PX may receive a data signal from the source line SL if the gate signal is provided to the gate line GL. The pixel PX may express light of a certain brightness corresponding to an inputted data signal. The pixel PX may display an image in one frame unit.

If the display device 100 is an organic light emitting diode display, each of the pixels PX may include a plurality of transistors each including a driving transistor and an organic light emitting diode. The driving transistor included in the pixel PX may supply a current corresponding to a data signal to the organic light emitting diode, and accordingly, the organic light emitting diode may emit light with a predetermined brightness. If the display device 100 is a liquid crystal display, each of the pixels PX may include a switching transistor and a liquid crystal capacitor. The pixel PX may control transmittance of liquid crystal in response to the data signal so that light of a certain brightness is provided to an outside.

In FIG. 1, the pixel PX is illustrated as connected to one source line SL and one gate line GL, a connection structure of signal lines of the pixels PX of the display device is not limited to thereto. For example, various signal lines may be additionally connected in response to a circuit structure of the pixels PX. In some implementations, the pixel PX may be implemented in various currently known forms.

The gate driver 120 may provide a plurality of gate signals G1, G2, . . . , and Gh. The gate signals G1, G2, . . . , and Gh may be pulse signals having an enable level and a disable level. The gate signals G1, G2, . . . , and Gh may be applied to a plurality of gate line GL. If a gate signal of an enable level is applied to the gate line GL connected to pixel PX, a data signal applied to the source line SL connected to the pixel PX may be transferred to the pixel PX. The gate driver 120 may provide the gate signals G1, G2, . . . , and Gh during a plurality of horizontal periods. One frame may include the multiple horizontal periods.

The source driver 130 may receive data DATA in a form of a digital signal from the timing controller 140 and may convert the data DATA into data signals S1, S2, . . . , Sk in a form of an analog signal. Herein, the data DATA may include gray information corresponding to each pixel PX for displaying an image signal IS on the pixel array 110. The source driver 130 may transmit a plurality of data signals S1, S2, . . . , and Sk to the pixel array 110 according to a source driver control signal CONT2 provided from the timing controller 140. The source driver 130 may be referred to as a data driver.

The source driver 130 may be electrically connected to a plurality of source lines SL. The source driver 130 may transmit a plurality of data signals S1, S2, . . . , and Sk to the source lines SL electrically connected thereto.

The source driver 130 may include a shift register 131, a plurality of amplifier areas 132*a*, 132*b*, . . . , and 132*h*, a bias circuit 136, and a gamma voltage generator 138. Each component included in the source driver 130 is not limited to an example shown in FIG. 1, and an additional component may be included in the source driver 130.

The shift register 131 may sample the data DATA in response to a horizontal synchronization signal Hysnc, and may provide sampled image data LD1, . . . , and LDk to the amplifier areas 132*a*, 132*b*, . . . , and 132*h*. The data DATA may include a plurality of source data corresponding to the source lines SL, and each of the source data may include a plurality of bits. The shift register 131 may generate image data LD1, . . . , and LDK having a plurality of bits by sampling each of the bits of the data DATA. The horizontal synchronization signal Hsync may be a signal having a predetermined period, and may be a signal that determines a scan period of the pixels PX connected to the respective gate lines GL.

Each of the amplifier areas 132*a*, 132*b*, . . . , and 132*h* may include a level shifter 132, a digital-to-analog converter DAC, and an amplifier 135. Hereinafter, a description will be made with reference to the amplifier area 132*a* that outputs a data signal S1.

The level shifter 133 may level-shift the image data LD1. The level shifter 133 may receive the image data LD1 at a low voltage level and output decoded image data HD1 at a high voltage level to the DAC 134. In some implementations, the image data LD1 may include a plurality of bits, and the level shifter 133 may generate the decoded image data HD1 having a plurality of bits by level shifting the bits of the image data LD1. The level shifter 133 may receive the digital signal LD1 to provide the DAC 134 with the decoded image data HD1 having a level that has been shifted to swing between target voltage levels.

In some implementations, the level shifter 133 may control an output bias current of the decoded image data HD1 based on a bias control signal IB. As the output bias current is controlled, a slew rate of the decoded image data HD1 may be controlled. In some implementations, the level shifter 133 may control output bias currents of the bits of the decoded image data HD1 to have a same magnitude or different magnitudes. For example, the level shifter 133 may control an output bias current of a first bit of the decoded image data HD1 and an output bias current of a second bit, which is higher than the first bit, to a first level. Alternatively, the level shifter 133 may control the output bias current of the first bit of the decoded image data HD1 to the first level, and may control the output bias current of the second bit, which is higher than the first bit, to a second level higher than the first level. In some implementations, the level shifter 133 may control the output bias current of at least one bit among the bits of the decoded image data HD1. For example, the level shifter 133 may control the output bias current of the bits excluding an MSB. In some implementations, the level shifters 133 included in the amplifier areas 132*a*, 132*b*, . . . , and 132*h* may jointly control the output bias current of the same bit based on the bias control signal IB. That is, the level shifters 133 included in the amplifier areas 132*a*, 132*b*, . . . , and 132*h* and outputting the first bit among the bits of the decoded image data HD1 may receive the same bias control signal IB. The level shifters 133 that output the first bit may control the output bias current of the first bit of the decoded image data HD1 to a same value.

The DAC 134 may output an analog signal AD1 corresponding to the decoded video data HD1. The DAC 134 may receive a plurality of gamma voltages GV along with the decoded video data HD1. The gamma voltages GV may be provided by a gamma voltage generator 138. The DAC 134 may select at least some of the gamma voltages GV from among the gamma voltages GV based on the decoded image data HD1 to transfer it as an input voltage to the amplifier 135 through an output port.

The amplifier 135 may output the input voltage transferred from the DAC 134 as a data signal Si to a pixel connected to the corresponding source line.

The bias circuit 136 may supply the bias control signal IB to the level shifters 133 of the amplifier areas 132*a*, 132*b*, . . . , and 132*h*. The bias circuit 136 may output the bias control signal IB and/or may control a magnitude of the bias control signal IB, based on a bias start signal CI included in the source driver control signal CONT2. In some implementations, the bias circuit 136 may include one-time programmable (OTP) memory 137. The bias circuit 136 may control the magnitude of the bias control signal IB by referring to data stored in the OTP memory 137. For example, if the bias start signal CI is inputted, the bias circuit 136, which outputs a bias control signal IB of a first level, may output a bias control signal IB of a second level that is different from the first level by referring to data stored in the OTP memory 137. That is, the bias circuit 136 may perform bias trimming with reference to data stored in the OTP memory 137. In some implementations, data stored in OTP memory 137 may have different values for each source driver 130. That is, source drivers 130 manufactured through a same process may store different values in the OTP memory 137 according to an on chip variation (OCV).

The gamma voltage generator 138 may determine a number of the gamma voltages GV based on a number of the bits of the decoded image data HD1, and may determine a magnitude of each of the gamma voltages GV based on operating conditions of the display device 100, settings of a gamma voltage register, or the like. In some implementations, the number of the gamma voltages GV may be determined according to a number of bits of image data. For example, if the decoded video data HD1 is 8-bit data, the number of the gamma voltages GV may be 28 or less, and if the decoded video data HD1 is 10-bit data, the number of the gamma voltages GV may be 210 or less. That is, if the decoded image data HD1 is data having n bits, the gamma voltages GV may have 2n different magnitudes. The gamma voltage generator 138 may determine the magnitude of each of the gamma voltages GV by selecting at least some of a plurality of reference voltages.

The timing controller 140 may receive an image signal IS and a driving control signal CTRL from a host device, and may control the gate driver 120 and the source driver 130. Herein, the host device may be a computing device or system that controls the display device 100 to display an image desired by a user on the pixel array 110 from an outside. The driving control signal CTRL provided from the host device may include control commands for controlling the gate driver 120 and the source driver 130, setting data, etc. The timing controller 140 may control the gate driver 120 and the source driver 130 based on the driving control signal CTRL. For example, the driving control signal CTRL may include a horizontal synchronization signal HSYNC, a vertical synchronization signal VSYNC, a main clock signal MCLK, and a data enable signal DE. The timing controller 140 may divide image data IS in units of one frame based on the vertical synchronization signal VSYNC, and may generate data DATA by dividing the image data IS in units of the gate lines GL based on the horizontal synchronization signal HSYNC. The timing controller 140 may perform control to synchronize operations of the source driver 130 and the gate driver 120 by transmitting the gate driver control signal CONT1 and the source driver control signal CONT2 to the gate driver 120 and source driver 130, respectively, The pixel array 110 and the gate driver 120 may be implemented on a same substrate, and the source driver 130 and the timing controller 140 may be configured as a single chip. In some implementations, the pixel array 110, the gate driver 120, the source driver 130, and the timing controller 140 may be implemented on a same substrate. In some implementations, the gate driver 120, source driver 130, and the timing controller 140 may be configured as a single chip. The gate driver 120 may be implemented as a separate semiconductor die, chip, or module to be connected to the pixel array 110. Additionally, a portion of the gate driver 120 may be positioned on a substrate where the pixel array 110 is positioned, and a remaining portion may be included in a separate chip.

Figure 2:
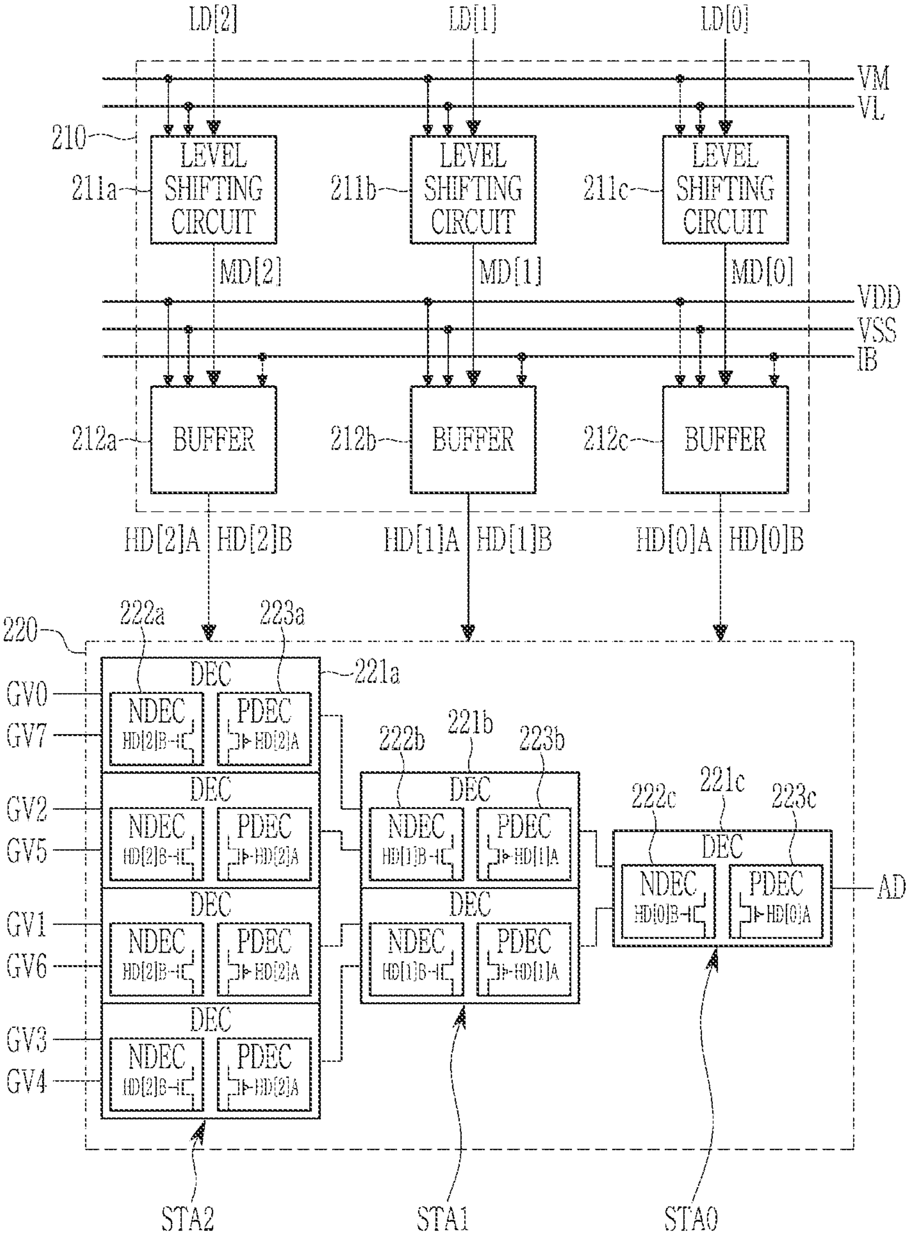
FIG. 2 illustrates some components of an example of a source driver.

FIG. 2 illustrates some components of an example of a source driver.

Referring to FIG. 2, one level shifter 210 and one DAC 220 corresponding to one source line are shown. The level shifter 210 receives 3-bit image data LD[2:0], and outputs 3-bit decoded image data HD[2:0]A and HD[2:0]B. The DAC 220 receives 3-bit decoded image data HD[2:0]A and HD[2:0]B, and outputs $2^3$ (=8) gamma voltages GV0, . . . , and GV7 as an analog signal AD based on the 3-bit decoded image data HD[2:0]A and HD[2:0]B. Hereinafter, an example of outputting an analog signal AD based on 3-bit image data LD[2:0] will be described, but the present disclosure is applicable even when outputting an analog signal based on n-bit image data and is not limited to an example below. For example, in FIG. 14, a level shifter that receives 5-bit image data and outputs 5 bits of decoded image data will be described. 5 bits of decoded image data will be used to select one of $2^5$ (=32) gamma voltages as an analog signal.

The level shifter 210 may be connected to the DAC 220, and may output decoded image data HD[2:0]A and HD[2:0]B to the DAC 220. The level shifter 210 may include a plurality of level shifting circuits 211*a*, 211*b*, and 211*c* and a plurality of buffers 212*a*, 212*b*, and 212*c*.

The level shifting circuits 211*a*, 211*b*, and 211*c* may receive image data LD[3:0], may level-shift the image data LD[3:0] to a first voltage VM or a second voltage VL, and may supply the level-shifted data MD[2:0] to the buffers 212*a*, 212*b*, and 212*c*.

The buffers 212*a*, 212*b*, and 212*c* receive data MD[2:0], may level-shift data MD[2:0] to a third voltage VDD or a fourth voltage VSS, and may output level-shifted decoded image data HD[2:0]A and HD[2:0]B. The buffers 212*a*, 212*b*, and 212*c* may output decoded image data HD[2:0]A obtained by inverting data MD[2:0] and decode image data HD[2:0]B obtained by inverting decode image data HD[2:0]A The buffers 212*a*, 212*b*, and 212*c* may respectively output upper bits HD[2]A and HD[2]B, middle bits HD[1]A and HD[1]B, and lower bits HD[0]A and HD[0]B.

The DAC 220 may output one of a plurality of gamma voltages GV0, . . . , and GV7 as an analog signal AD based on the input decoded video data HD[2:0]A and HD[2:0]B The DAC 220 may include a plurality of stages STA2, STA1, and STA0. The stages STA2, STA1, and STA0 may respectively input upper bits HD[2]A and HD[2]B, middle bits HD[1]A and HD[1]B, and lower bits HD[0]A and HD[0]B. An output terminal of each of the stages STA2, STA1, and STA0 may be connected to an input terminal of a next stage. For example, the output terminal of the stage STA2 may be connected to the input terminal of the next stage STA1.

The stage STA2 that receives the upper bits HD[2]A and HD[2]B may include 22 decoders 221*a* that receive $2^3$ gamma voltages GV0, . . . , and GV7. The decoders 221*a* may receive two gamma voltages GV0 and GV7, GV2 and GV5, GV1 and GV6, or GV3 and GV4, and may output one gamma voltage according to a bit HD[2] of the decoded image data. The decoders 221*a* may include a P-type decoder 223*a* and an N-type decoder 222*a*. A bit HD[2]A of the decoded image data is provided to a gate of a transistor included in the P-type decoder 223*a*, and a bit HD[2]B of the decoded image data may be provided to a gate of a transistor included in the N-type decoder 222*a*. At least one of the P-type decoder 223*a* and the N-type decoder 222*a* included in the same decoder 221*a* may output one of the two input gamma voltages GV0 and GV7, GV2 and GV5, GV1 and GV6, or GV3 and GV4.

The stage STA1, which receives the middle bits HD[1]A and HD[1]B, may include 21 decoders 221*b* that receive 22 gamma voltages outputted from the previous stage STA2. The decoders 221*b* may receive two gamma voltages, and may output one gamma voltage according to a bit HD[1] of the decoded image data. The decoders 221*b* may include a P-type decoder 223*b* and an N-type decoder 222*b*. A bit HD[1]A of the decoded image data is provided to a gate of a transistor included in the P-type decoder 223*b*, and a bit HD[1]B of the decoded image data may be provided to a gate of a transistor included in the N-type decoder 222*b*.

The stage STA0, which receives the lower bits HD[0]A and HD[0]B, may include 20 decoders 221*c* that receive 21 gamma voltages outputted from the previous stage STA1. The decoders 221*c* may receive two gamma voltages, and may output one gamma voltage according to a bit HD[0] of the decoded image data. The decoders 221*c* may include a P-type decoder 223*c* and an N-type decoder 222*b*. A bit HD[0]A of the decoded image data may be provided to a gate of a transistor included in the P-type decoder 223*c*, and a bit HD[0]B of the decoded image data may be provided to a gate of a transistor included in the N-type decoder 222*c*.

The level shifting circuits 211*a*, 211*b*, and 211*c* and the buffers 212*a*, 212*b*, and 212*c* will be described with reference to FIG. 3.

Figure 3:
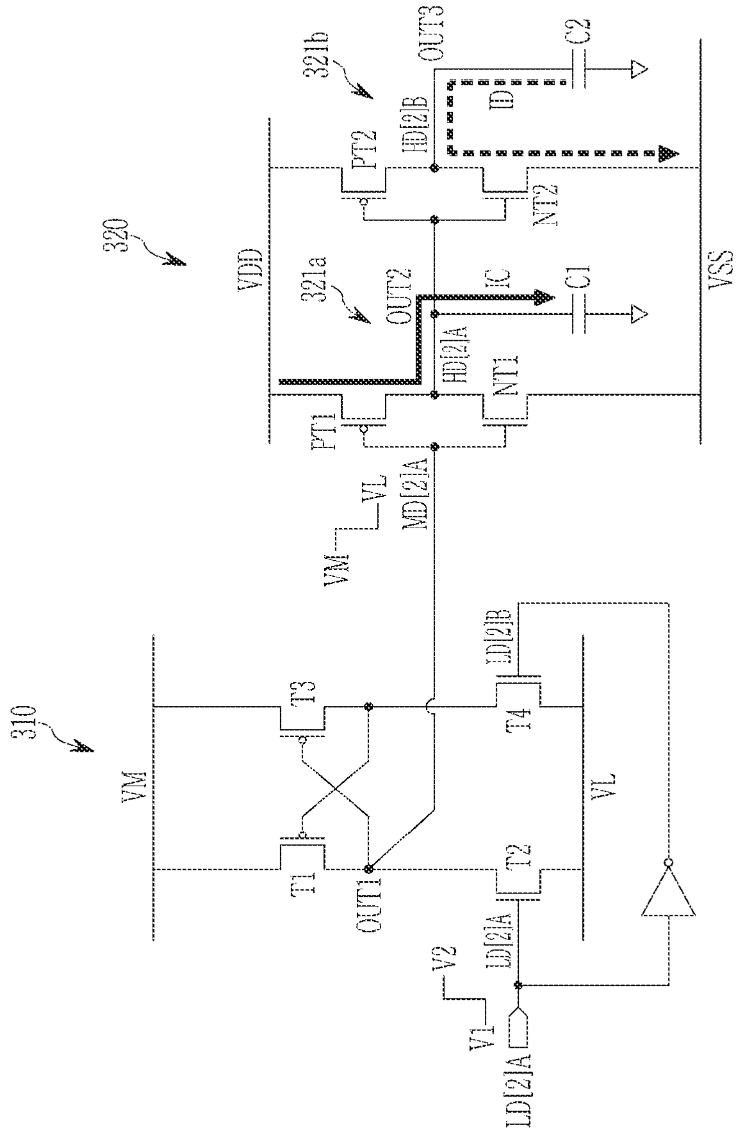
FIG. 3 illustrates a circuit diagram schematically showing a buffer and a level shifting circuit of an example of a source driver.

FIG. 3 illustrates a circuit diagram schematically showing a buffer and a level shifting circuit of an example of a source driver.

Referring to FIG. 3, the level shifting circuit 310 includes a cross-coupled inverter, and the cross-coupled inverter includes transistors T1 and T2 connected in series between the first voltage VM and the second voltage VL, and transistors T3 and T4 connected in series between the first voltage VM and the second voltage VL.

A bit LD[2]A of image data may be provided to a gate of the transistor T2, and a bit LD[2]B in which the bit LD[2]A is inverted may be provided to a gate of the transistor T4. The bit LD[2]B in which the bit LD[2]A of the image data is inverted and amplified may be outputted from an output terminal OUT1.

The buffer 320 may include 2-stage inverters 321*a* and 321*b*. The first stage inverter 321*a* may include transistors PT1 and NT1 connected in series between the third voltage VDD and the fourth voltage VSS, and the second stage inverter 321*b* may include transistors PT2 and NT2 connected in series between the third voltage VDD and the fourth voltage VSS. An input terminal of the first stage inverter 321*a* may be connected to the output terminal OUT1 of the level shifting circuit 310. An output terminal OUT2 may be connected to a gate of a transistor of the P-type decoder 223*a* included in the decoder 221*a*. An input terminal of the second stage inverter 321*b* may be connected to the output terminal OUT2 of the first stage inverter 321*a*.

A bit MD[2]A inverted and amplified by the level shifting circuit 310 may be inputted to the input terminal of the first stage inverter 321*a*. The bit HD[2]A in which the bit MD[2]A is inverted and the amplified may be outputted from the output terminal OUT2 of the first stage inverter 321*a*.

The bit HD[2]A inverted and amplified by the first stage inverter 321*a* may be inputted to the input terminal of the second stage inverter 321*b*. The bit HD[2]A in which the bit HD[2]A is inverted and the amplified may be outputted from the output terminal OUT3 of the second stage inverter 321*b*. An output terminal OUT3 may be connected to a gate of a transistor of the N-type decoder 222*a* included in the decoder 221*a*. If the bit LD[2]A of the image data transitions from the first level V1 to the second level V2, the bit MD[2]A may transition from a first voltage VM to a second voltage VL. Then, a transistor PT1 of the first stage inverter 321*a* may be turned on, and in order to charge an input capacitor C1 of a gate of a transistor of the P-type decoder 223*a*, a charging current IC may flow from the third voltage VDD to the input capacitor C1 through the transistor PT1. As the input capacitor C1 is charged, the bit HD[2]A may transition from the fourth voltage VSS to the third voltage VDD. Then, a transistor NT2 of the second stage inverter 321*b* may be turned on, and in order to discharge an input capacitor C2 of a gate of a transistor of the N-type decoder 222*a*, a discharge current ID may flow from the input capacitor C2 to the fourth voltage VSS through the transistor NT2. As the input capacitor C2 is discharged, the bit HD[2]B may transition from the third voltage VDD to the fourth voltage VSS.

The bit HD[2]A of the decoded image data may be provided to gates of transistors of four P-type decoders 223*a*, a bit HD[1]A of the decoded image data may be provided to gates of transistors of the two P-type decoders 223*b*, and a bit HD[0]A of the decoded image data may be provided to a gate of a transistor of one P-type decoder 223*c*. Accordingly, a time for charging four input capacitors C1 to which the bit HD[2]A of the decoded image data is applied is the longest. The bit HD[2]B of the decoded image data may be provided to gates of transistors of four N-type decoders 222*a*, a bit HD[1]B of the decoded image data may be provided to gates of transistors of the two N-type decoders 222*b*, and a bit HD[0]B of the decoded image data may be provided to a gate of a transistor of one N-type decoder 222*c*. Accordingly, a time for discharging four input capacitors C2 to which the bit HD[2]B of the decoded image data is applied is the longest. Accordingly, a timing of outputting the analog signal AD may be determined by a timing at which the bits HD[2]A and HD[2]B of the decoded image data transition. In addition, a period between timings at which the bits HD[1]A and HD[1]B and the bits HD[0]A and HD[0]B of the decoded image data transition where a difference in absolute amounts of input capacitance loads is relatively small may be shorter than a period between timings at which the bits HD[2]A and HD[2]B and the bits HD[1]A and HD[1]B of the decoded image data transition. A period between timings at which the bit HD[1]B and the bit HD[0]B transition are relatively short, and thus around bouncing, in which the fourth voltage VSS temporarily increases, may occur due to the discharge current ID. This will be described with reference to FIG. 4.

Figure 4:
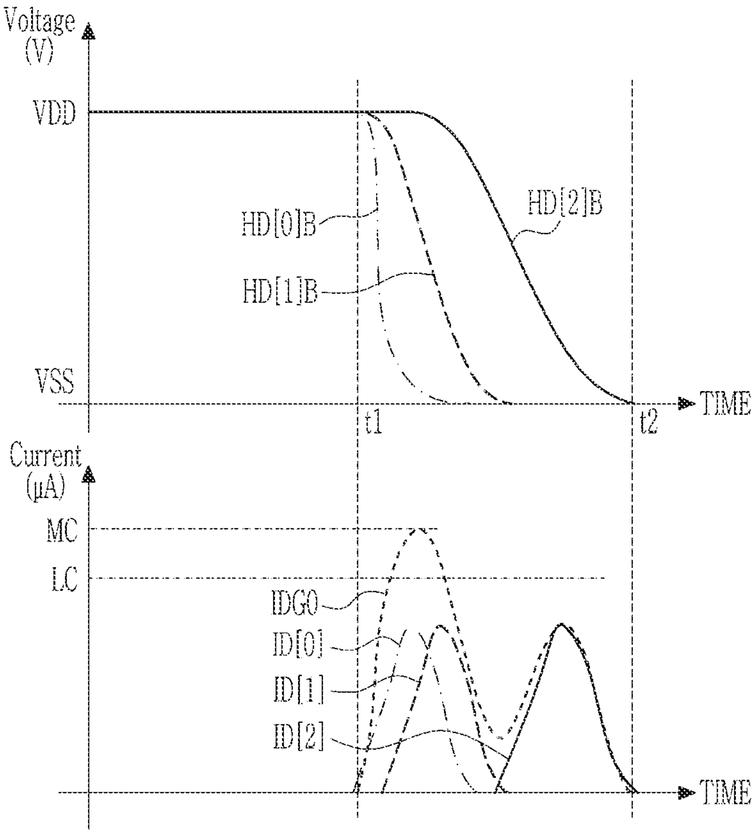
FIG. 4 illustrates a graph showing an output voltage and a discharging current of an example of a level shifter.

FIG. 4 illustrates a graph showing an output voltage and a discharging current of an example of a level shifter.

As illustrated in FIG. 4, the bits HD[0:2]B transitions from the third voltage VDD to the fourth voltage VSS at a time point t1. The transition of the bit HD[2]B is completed at a time point t2 after the transition of the bit HD[1]B and the bit HD[0]B is completed. Accordingly, the analog signal AD outputted from the DAC 220 depends on the bit HD[2]B with a lowest slew rate.

A period between the timings at which the bit HD[1]B and the bit HD[0]B transition is short compared to a period between the timings at which the bit HD[2]B and the bit HD[1]B transition, and thus discharge currents ID[1] and ID[0] may be generated within a relatively close time. All discharge currents ID[1] and ID[0] flow in a wire that applies the fourth voltage VSS, a maximum value MC of a total discharge current IDG0 flowing in the wire applying the fourth voltage VSS may exceed a reference value TLC. The fourth voltage VSS may temporarily increase due to the total discharge current IDG0 exceeding the reference value TLC. That is, ground bouncing may occur due to the total discharge current IDG0. This affects the buffers 212*a*, 212*b*, and 212*c* that receive the same fourth voltage VSS, and may also cause noise due to coupling in interfaces physically adjacent to the wire that supplies the fourth voltage VSS.

In some implementations, the buffers 212*a*, 212*b*, and 212*c* may control output bias currents of the decoded image data HD[2:0]A and HD[2:0]B based on a same bias control signal IB. This will be described with reference to FIG. 5.

Figure 5:
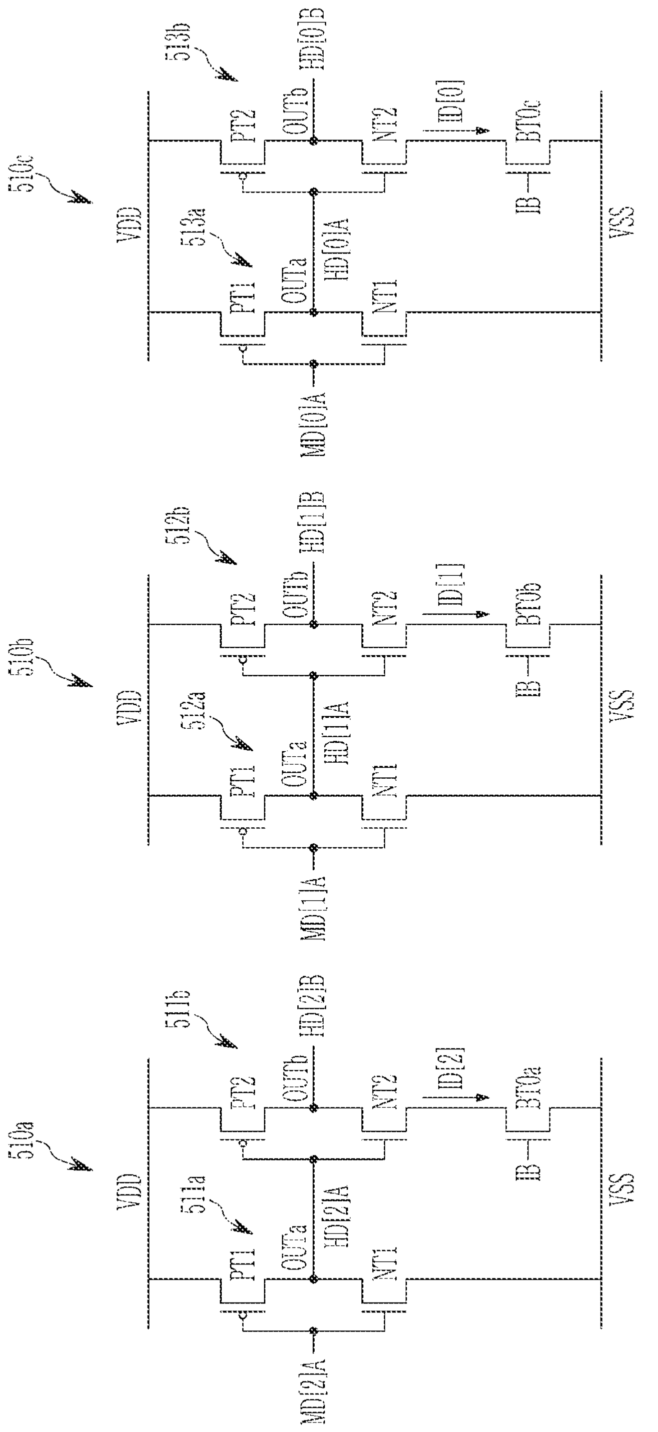
FIG. 5 illustrates a circuit diagram for recovery of an example of a level shifter.

FIG. 5 illustrates a circuit diagram for recovery of an example of a level shifter.

Referring to FIG. 5, a plurality of buffers 510*a*, 510*b*, and 510*c* output the decoded image data HD[2:0]A and HD[2:0]B. The buffers 510*a*, 510*b*, and 510*c* each include a 2-stage inverter 511*a* and 511*b*, 512*a* and 512*b*, and 513*a* and 513*b*. The buffer 510*a* outputs the upper bits HD[2]A and HD[2]B of the decoded image data, the buffer 510*b* outputs the middle bits HD[1]A and HD[1]B of the decoded image data, and the buffer 510*c* outputs the lower bits HD[0]A and HD[0]B of the decoded image data.

An input terminal of the first stage inverter (511*a*/512*a*/513*a*) may be connected to an output terminal of the level shifting circuit (211*a*/211*b*/211*c* in FIG. 2). An output terminal OUTa of the first stage inverter (511*a*/512*a*/513*a*) may be connected to a gate of a transistor of the P-type decoder (223*a*/223*b*/223*c*). Each of the first stage inverters 511*a*, 512*a*, and 513*a* may include transistors PT1 and NT1 connected in series between the third voltage VDD and the fourth voltage VSS.

The input terminal of the second stage inverter (511*b*/512*b*/513*b*) may be connected to the output terminal OUTa of the first stage inverter (511*a*/512*a*/513*a*). An output terminal OUTb of the second stage inverter (511*b*/512*b*/513*b*) may be connected to a gate of a transistor of the N-type decoder (222*a*/222*b*/222*c*). Each of the second stage inverters 511*b*, 512*b*, and 513*b* may include transistors PT2, NT2, and BT0*a*/BT0*b*/BT0*c* connected in series between the third voltage VDD and the fourth voltage VSS. For example, the transistors PT2 and NT2 may be connected in an inverter structure, gates of transistors PT2 and NT2 may be connected to the output terminal OUTa of the first stage inverter (511*a*/512*a*/513*a*), and drains of transistors PT2 and NT2 may be connected to the output terminal OUTb. The bias transistors (BT0*a*/BT0*b*/BT0*c*) may be connected between a source of the transistor NT2 and the fourth voltage VSS. A bias transistor (BT0*a*/BT0*b*/BT0*c*), which is an amplifier area including the buffers 510*a*, 510*b*, and 510*c*, may be positioned in an amplifier area corresponding to one source line SL. Additionally, the bias transistor (BT0*a*/BT0*b*/BT0*c*) may be positioned between an amplifier area including the buffers 510*a*, 510*b*, and 510*c* and an amplifier area adjacent to the amplifier area. This will be described later in FIG. 13.

In some implementations, the bias transistor (BT0*a*/BT0*b*/BT0*c*) may be positioned on a path that discharges an input capacitor of a transistor of the N-type decoder (222*a*/222*b*/222*c* in FIG. 2). The bias control signal IB may be inputted to a gate of the bias transistor (BT0*a*/BT0*b*/BT0*c*). The bias transistor (BT0*a*/BT0*b*/BT0*c*) may limit a discharge current (ID[2]/ID[1]/ID[0]) based on a voltage level of the bias control signal IB. This will be described with reference to FIG. 6.

Figure 6:
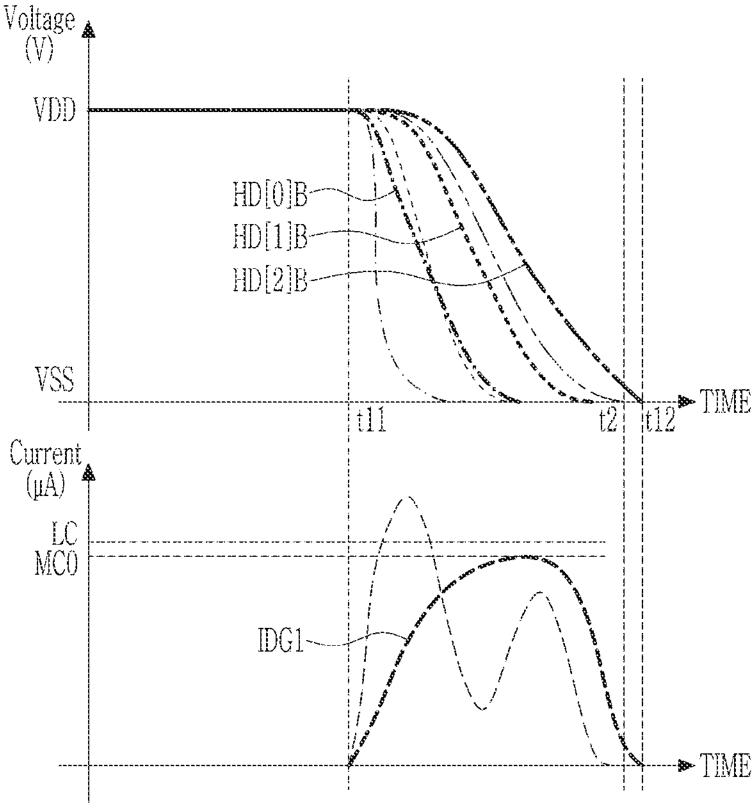
FIG. 6 illustrates a graph showing an output voltage and a discharging current of another example of a level shifter.

FIG. 6 illustrates a graph showing an output voltage and a discharging current of another example of a level shifter.

In FIG. 6, a dotted line represents an output voltage and a discharge current of a level shifter in FIG. 4, and a solid line represents an output voltage and a discharge current of a level shifter. As illustrated in FIG. 6, the bits HD[0:2]B transition from the third voltage VDD to the fourth voltage VSS at a time point t11. The transition of the bit HD[2]B is completed at a time point t12 after the transition of the bit HD[1]B and the bit HD[0]B is completed. Accordingly, the analog signal AD outputted from the DAC 220 (FIG. 2) is dependent on the bit HD[2]B with a lowest slew rate. A time point t12 is later than the time t2, which is a transition completion timing of the bit HD[2]B in FIG. 4 due to a limitation of the discharge current ID[2] by the bias transistor BT0*a*, Due to limitations of the discharge currents ID[2], ID[1], and ID[0], slew rates of the bit HD[2]B, the bit HD[1]B, and the bit HD[0]B may be lower compared to the implementation of FIG. 4. As the slew rate of the bit HD[2]B, the bit HD[1]B, and the bit HD[0]B decreases, a difference between a period between timings at which the bit HD[1]B and the bit HD[0]B transition and a period between timings at which the bits HD[2]B and the bits HD[1]B transition may become smaller. That is, a maximum value MC0 of the total discharge current IDG1 flowing through the wire applying the fourth voltage VSS may be less than or equal to the reference value TLC by limiting amounts of discharge currents D [2], ID[1], and ID[0], Accordingly, ground bouncing due to the total discharge current IDG1 may be reduced. This may reduce an impact on the buffers 510*a*, 510*b*, and 510*c* that receive the same fourth voltage VSS and a noise caused to an interface that is physically adjacent to the wire that supplies the fourth voltage VSS.

Figure 7:
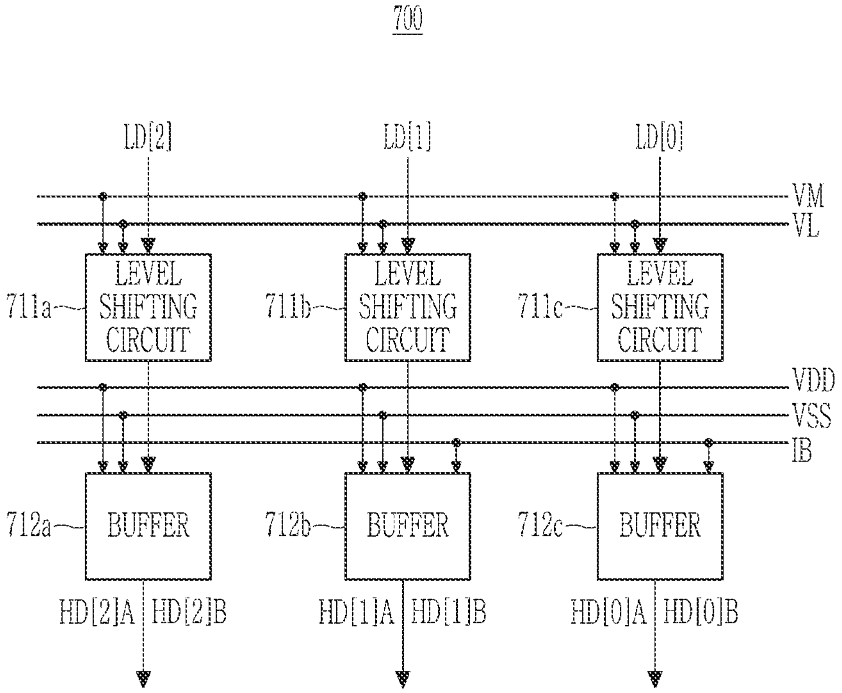
FIG. 7 illustrates a block diagram showing an example of a level shifter.

FIG. 7 illustrates a block diagram showing an example of a level shifter.

Referring to FIG. 7, the level shifter 700 receives 3-bit image data LD[2:0], and outputs 3-bit decoded image data HD[2:0]A and HD[2:0]B. The level shifter 700 is connected to the DAC 220 (FIG. 2), and outputs decoded image data HD[2:0]A and HD[2:0]B to the DAC 220. The level shifter 700 includes a plurality of level shifting circuits 711*a*, 711*b*, and 711*c* and a plurality of buffers 712*a*, 712*b*, and 712*c*.

The level shifting circuits 711*a*, 711*b*, and 711*c* may receive image data LD[3:0], may level-shift the image data LD[3:0] to a first voltage VM or a second voltage VL, and may supply the level-shifted data MD[2:0] to the buffers 712*a*, 712*b*, and 712*c*.

The buffers 712*a*, 712*b*, and 712*c* receive data MD[2:0], may level-shift data MD[2:0] to a third voltage VDD or a fourth voltage VSS, and may output level-shifted decoded image data HD[2:0]A and HD[2:0]B. The buffers 712*a*, 712*b*, and 712*c* may output decoded image data HD[2:0]A obtained by inverting data MD[2:0] and decode image data HD[2:0]B obtained by inverting decode image data HD[2:0]A. The buffers 712*a*, 712*b*, and 712*c* may respectively output upper bits HD[2]A and HD[2]B, middle bits HD[1]A and HD[1]B, and lower bits HD[0]A and HD[0]B.

In some implementations, the buffers 712*b* and 712*c* may control an output bias current of some bits HD[1:0] of the decoded image data based on the same bias control signal IB. The bias control signal IB may not be applied to the buffer 712*a* that outputs the upper bit HD[2]. This will be described with reference to FIG. 8.

Figure 8:
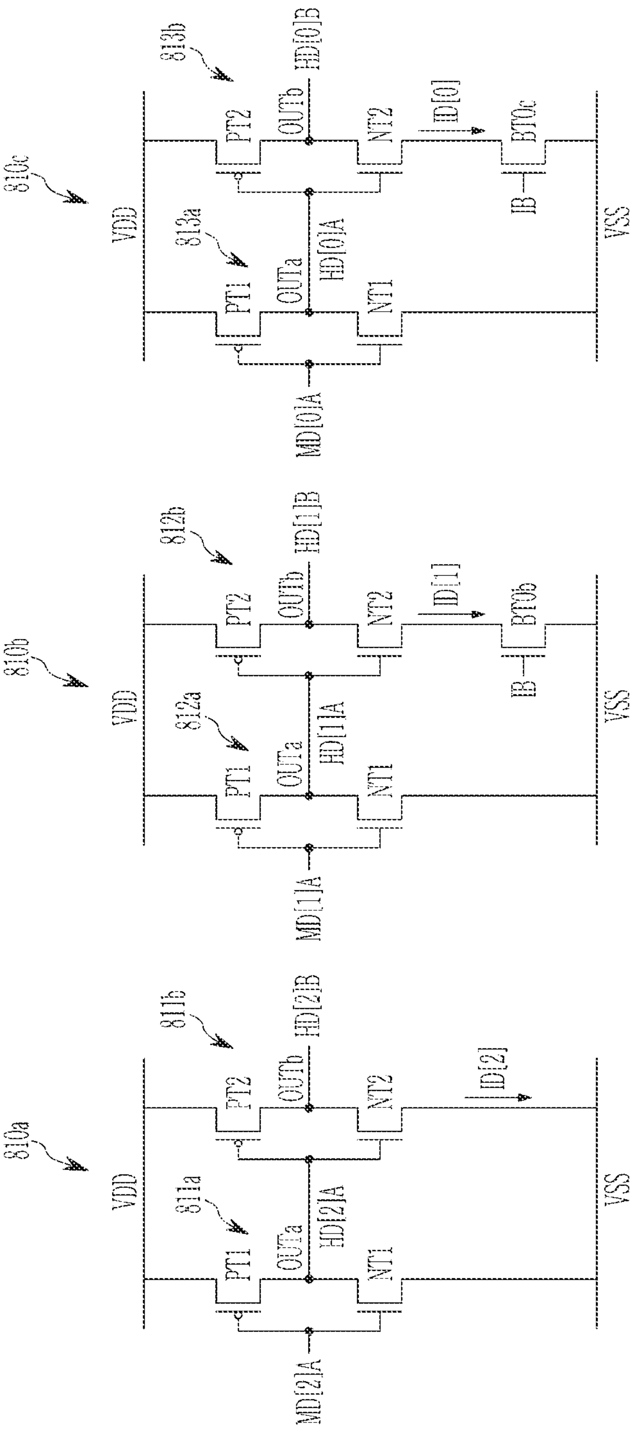
FIG. 8 illustrates a circuit diagram for recovery of another example of a level shifter.

FIG. 8 illustrates a circuit diagram for recovery of another example of a level shifter.

Referring to FIG. 8, a plurality of buffers 810*a*, 810*b*, and 810*c* output the decoded image data HD[2:0]A and HD[2:0]B. A description of the buffers 810*a*, 810*b*, and 810*c* that are the same or similar to the description of the buffers 510*a*, 510*b*, and 510*c* illustrated in FIG. 5 will be omitted.

Among the second stage inverters 811*b*, 812*b*, and 813*b*, the second stage inverters 812*b* and 813*b* which receive some bits of data MD[1:0] may include transistors PT2, NT2, and BT0*b*/BT0*c* connected in series between the third voltage VDD and the fourth voltage VSS. In some implementations, some bits MD[1:0] may be bits excluding the upper bit MD[2]. For example, the transistors PT2 and NT2 may be connected in an inverter structure, gates of transistors PT2 and NT2 may be connected to the output terminal OUTa of the first stage inverter (812*a*/813*a*), and drains of transistors PT2 and NT2 may be connected to the output terminal OUTb. The bias transistor (BT0*b*/BT0*c*) may be connected between a source of the transistor NT2 and the fourth voltage VSS. In some implementations, the bias transistor (BT0*b*/BT0*c*) may be positioned on a path that discharges an input capacitor of a transistor of the N-type decoder (222*b*/222*c* in FIG. 2). The bias control signal IB may be inputted to a gate of the bias transistor (BT0*b*/BT0*c*). The bias transistor (BT0*b*/BT0*c*) may limit a discharge current (ID[1]/ID[0]) based on a voltage level of the bias control signal IB. This will be described with reference to FIG. 9.

Figure 9:
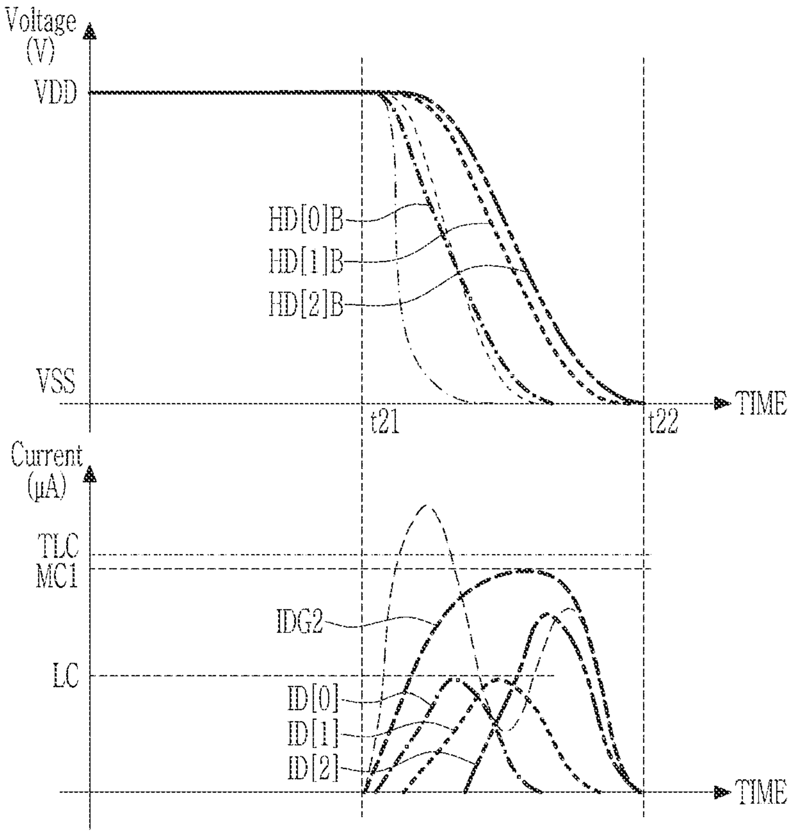
FIG. 9 illustrates a graph showing an output voltage and a discharging current of another example of a level shifter.

FIG. 9 illustrates a graph showing an output voltage and a discharging current of another example of a level shifter.

In FIG. 9, a dotted line represents an output voltage and a discharge current of a level shifter in FIG. 4, and a solid line represents an output voltage and a discharge current of a level shifter. As illustrated in FIG. 9, the bits HD[0:2]B transition from the third voltage VDD to the fourth voltage VSS at a time point t21. The transition of the bit HD[2]B is completed at a time point t22 after the transition of the bit HD[1]B and the bit HD[0]B is completed. Accordingly, the analog signal AD outputted from the DAC 220 (FIG. 2) is dependent on the bit (HD[2]B) with a lowest slew rate. Since the discharge current ID[2] is not limited, a time point t22 may be substantially the same as the time point t2, which is a transition completion timing of the bit HD[2]B in FIG. 4.

The discharge currents ID[1] and ID[0] may be limited to a same current amount LC. Due to limitations of the discharge currents ID[1] and ID[0], slew rates of the bit HD[1]B and the bit HD[0]B may be lower compared to the implementation of FIG. 4. A maximum value MC1 of the total discharge current IDG2 flowing through the wire applying the fourth voltage VSS may be less than or equal to the reference value TLC by limiting amounts of discharge currents ID[1] and ID[0], Accordingly, ground bouncing due to the total discharge current IDG2 may be reduced. This may reduce an impact on the buffers 810*a*, 810*b*, and 810*c* that receive the same fourth voltage VSS and a noise caused to an interface that is physically adjacent to the wire that supplies the fourth voltage VSS.

Figure 10:
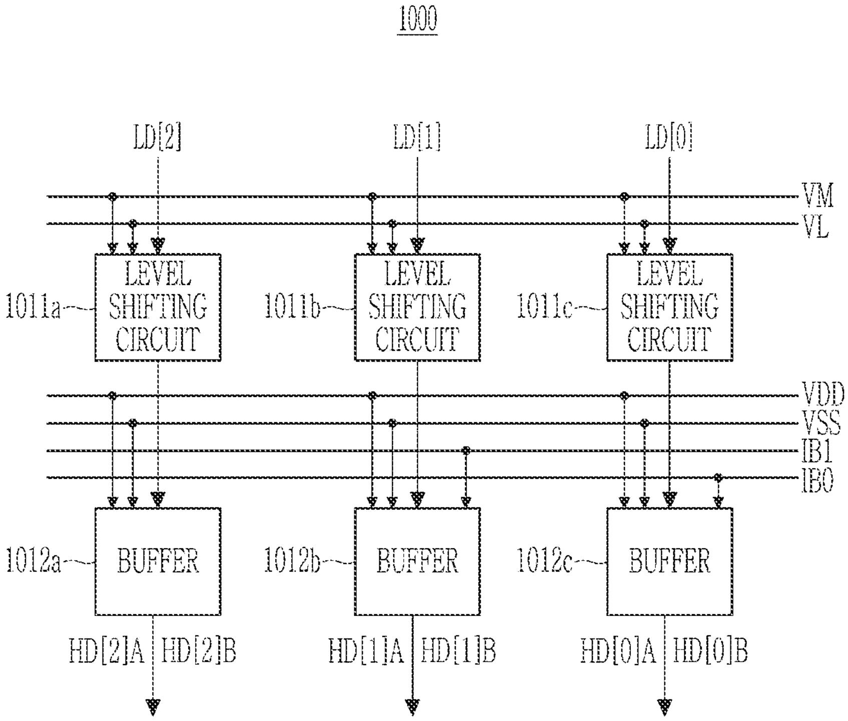
FIG. 10 illustrates a block diagram showing another example of a level shifter.

FIG. 10 illustrates a block diagram showing another example of a level shifter.

Referring to FIG. 10, the level shifter 1000 receives 3-bit image data LD[2:0], and outputs 3-bit decoded image data HD[2:0]A and HD[2:0]B. The level shifter 1000 is connected to the DAC 220 (FIG. 2), and outputs decoded image data HD[2:0]A and HD[2:0]B to the DAC 220. A description of the level shifter 1000 that is the same or similar to the description of the level shifter 700 illustrated in FIG. 7 will be omitted.

In some implementations, the buffers 1012*b* and 1012*c* may control an output bias current of some bits HD[1:0] of the decoded image data based on different bias control signals IB1 and IB0. The bias control signal IB1 and IB0 may not be applied to the buffer 1012*a* that outputs the upper bit HD[2]. This will be described with reference to FIG. 11.

Figure 11:
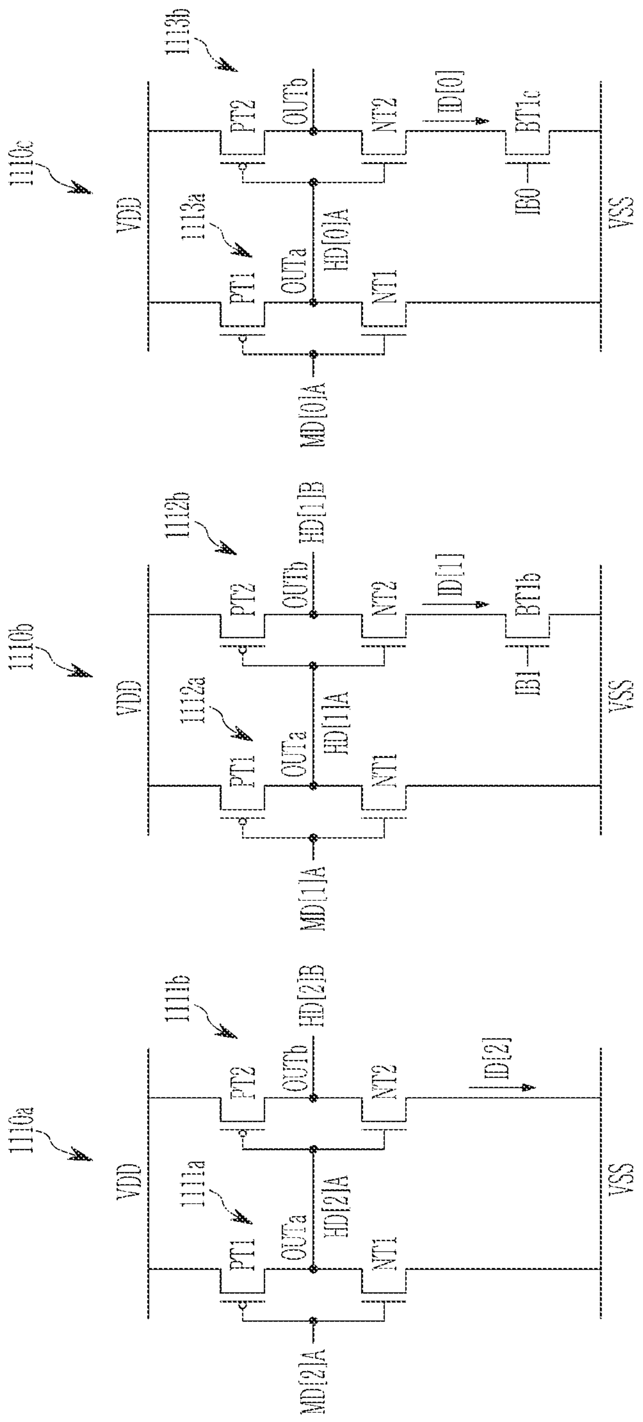
FIG. 11 illustrates a circuit diagram for recovery of another example of a level shifter.

FIG. 11 illustrates a circuit diagram for recovery of another example of a level shifter.

Referring to FIG. 11, a plurality of buffers 1110*a*, 1110*b*, and 1110*c* output decoded image data HD[2:0]A and HD[2:0]B. A description of the buffers 1110*a*, 1110*b*, and 1110*c* that are the same or similar to the description of the buffers 510*a*, 510*b*, and 510*c* illustrated in FIG. 5 will be omitted.

Among the second stage inverters 1111*b*, 1112*b*, and 1113*b*, the second stage inverters 112*b* and 113*b* which receive some bits of data MD[1:0] may include transistors PT2, NT2, and BT0*b*/BT0*c* connected in series between the third voltage VDD fourth voltage VSS. In some implementations, some bits MD[1:0] may be bits excluding the upper bit MD[2]. For example, the transistors PT2 and NT2 may be connected in an inverter structure, gates of transistors PT2 and NT2 may be connected to the output terminal OUTa of the first stage inverter (1112*a*/1113*a*), and drains of transistors PT2 and NT2 may be connected to the output terminal OUTb. The bias transistor (BT0*b*/BT0*c*) may be connected between a source of the transistor NT2 and the fourth voltage VSS. In some implementations, the bias transistor (BT0*b*/BT0*c*) may be positioned on a path that discharges an input capacitor of a transistor of the N-type decoder (222*b*/222*c* in FIG. 2). The bias control signal IB1 may be inputted to a gate of the bias transistor BT0*b*. The bias control signal IB0 may be inputted to a gate of the bias transistor BT0*c*. The bias transistor (BT0*b*/BT0*c*) may limit a discharge current (ID[1]/ID[0]) based on a voltage level of the bias control signal (IB1/IB0). In some implementations, the discharge current ID[0] flowing in the second stage inverter 1113*b* that outputs the lower bit HD[0]B may be more limited compared to the discharge current ID[1] flowing in the second stage inverter 1112*b* that outputs the middle bit HD[1]B. For example, a voltage level of the bias control signal IB0 may be lower than a voltage level of the bias control signal IB1. This will be described with reference to FIG. 12.

Figure 12:
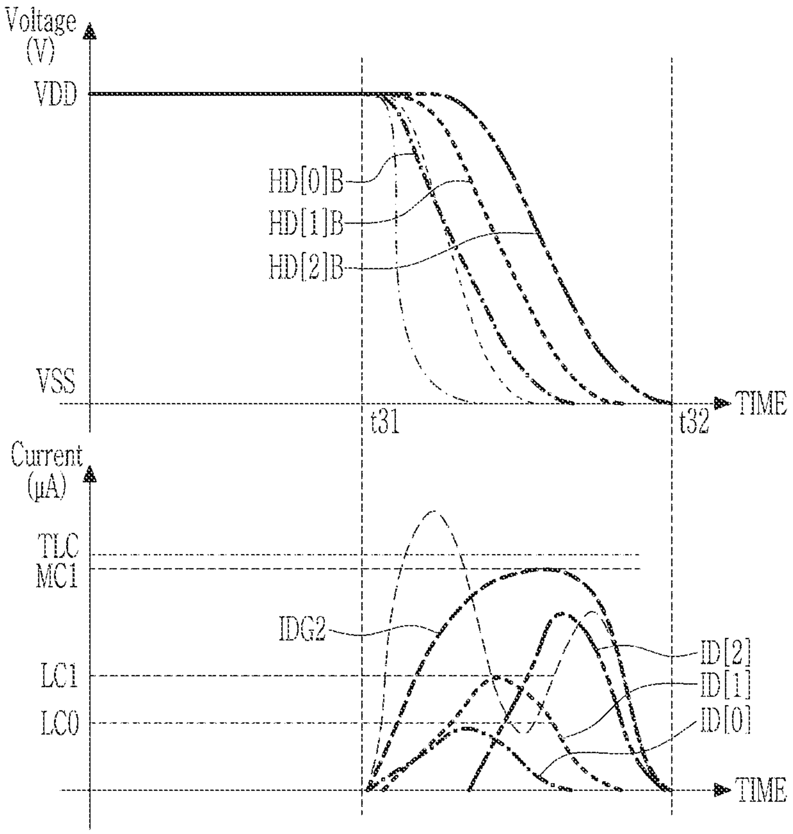
FIG. 12 illustrates a graph showing an output voltage and a discharging current of another example of a level shifter.

FIG. 12 illustrates a graph showing an output voltage and a discharging current of another example of a level shifter.

In FIG. 12, a dotted line represents an output voltage and a discharge current of a level shifter in FIG. 4, and a solid line represents an output voltage and a discharge current of a level shifter. As illustrated in FIG. 12, the bits HD[0:2]B transition from the third voltage VDD to the fourth voltage VSS at a time point t31. The transition of the bit HD[2]B is completed at a time point t32 after the transition of the bit HD[1]B and the bit HD[0]B is completed. Accordingly, the analog signal AD outputted from the DAC 220 (FIG. 2) is dependent on the bit HD[2]B with a lowest slew rate. Since the discharge current ID[2] is not limited, a time point t32 may be substantially the same as the time point t2, which is a transition completion timing of the bit HD[2]B in FIG. 4.

The discharge currents ID[1] and ID[0] may be limited to different current amounts LC1 and LC0. Due to limitations of the discharge currents ID[1] and ID[0], slew rates of the bit HD[1]B and the bit HD[0]B may be lower compared to the implementation of FIG. 4. In addition, due to a limitation in the discharge current ID[0], a slew rate of the bit HD[0]B may be lower compared to the implementation of FIG. 9. Since capacity of an input capacitor of a transistor connected to the output terminal OUTb of inverter 1113*b* that outputs the lower bit HD[0]B is smaller than capacity of an input capacitor of a transistor connected to the output terminal OUTb of inverter 1112*b*, which outputs the middle bit HD[1]B, the discharge current ID[0] may be limited to a smaller current amount than that of the discharge current ID[1]. A maximum value MC1 of the total discharge current IDG2 flowing through the wire applying the fourth voltage VSS may be less than or equal to the reference value TLC by limiting amounts of discharge currents ID[1] and ID[0], Accordingly, ground bouncing due to the total discharge current IDG2 may be reduced. This may reduce an impact on the buffers 1110*a*, 1110*b*, and 1110*c* that receive the same fourth voltage VSS and a noise caused to an interface that is physically adjacent to the wire that supplies the fourth voltage VSS.

Figure 13:
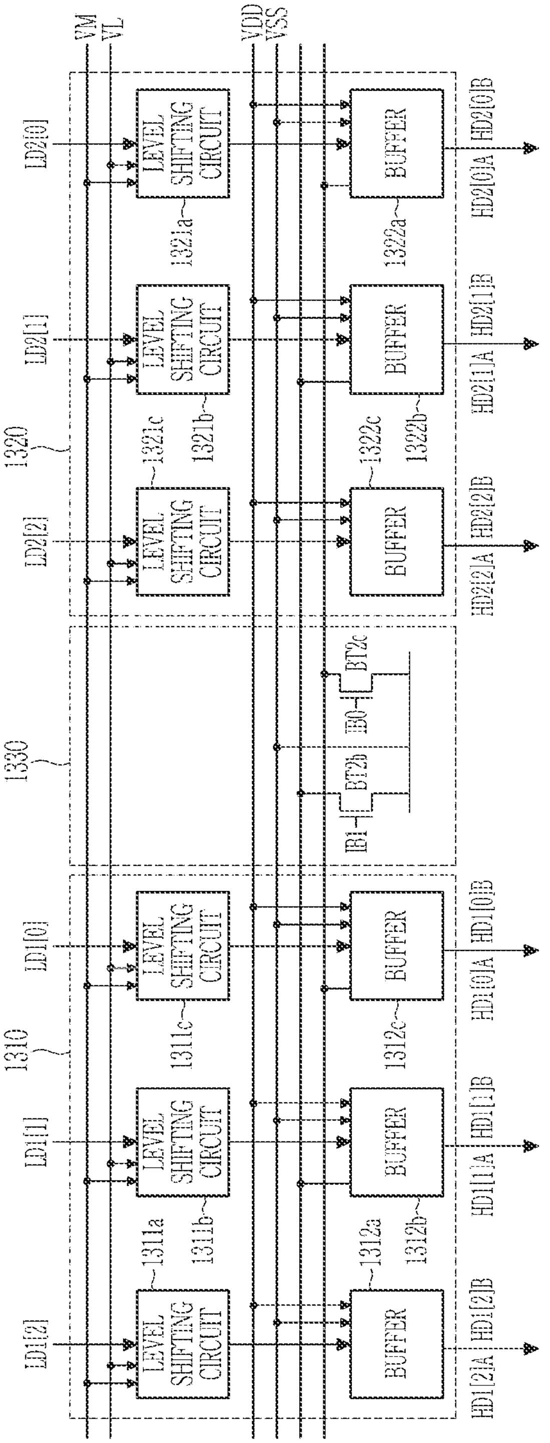
FIG. 13 illustrates a block diagram showing another example of a level shifter.

FIG. 13 illustrates a block diagram showing another example of a level shifter.

As illustrated in FIG. 13, a plurality of level shifters 1310 and 1320 are included in different amplifier areas (132*a*, 132*b*, . . . , and 132*h* in FIG. 1). Each of the level shifters 1310 and 1320 is connected to a different source line SL. Each of the level shifters 1310 and 1320 receives 3-bit image data (LD1[2:0]/LD2[2:0]), and outputs 3-bit decoded image data HD1 [2:0]A, HD1 [2:0]B/HD2 [2:0]A, HD2 [2:0]B. Each of the level shifters 1310 and 1320 is connected to the DAC 220 (FIG. 2), and outputs decode image data HD1 [2:0]A, HD1 [2:0]B/HD2 [2:0]A, HD2 [2:0]B to the DAC 220. A description of the level shifter 1300 that is the same or similar to the description of the level shifter 700 illustrated in FIG. 7 will be omitted.

At least one bias transistor BT2*b* and BT2*c* may be positioned in an area 1330 between the level shifters 1310 and 1320. For example, at least one bias transistor BT2*b* and BT2*c* may be positioned in the area 1330 between two adjacent level shifters 1310 and 1320. In some implementations, the area 1330 between the level shifters 1310 and 1320 may be an area where a repeater is positioned to transmit a signal from one amplifier area to another amplifier area. For example, a repeater may be positioned to performing amplification, inverting, and/or buffering so that a signal applied to a first group including the level shifter 1310 may also be applied to a second group including level shifter 1320 in the area 1330 between the first group and the second group. At least one bias transistor (BT2*b*, BT2*c*) connected to the first group including the level shifter 1310 and the second group including the level shifter 1320 may be located in the area 1330 where the repeater is positioned.

A first end of the bias transistor (BT2*b*/BT2*c*) may be connected to the corresponding buffer 1312*b*, 1322*b*/1312*c*, and 1322*c*. A second end of the bias transistor (BT2*b*/BT2*c*) may be connected to the fourth voltage VSS. The bias control signal (IB1/IB0) may be inputted to a gate of the bias transistor (BT2*b*/BT2*c*). For example, the bias control signal IB1, which controls the discharge current for outputting the middle bit HD[1]B, may be applied to the buffers 1312*b* and 1322*b*, and the bias control signal IB0, which controls the discharge current for outputting the lower bit HD[0]B, may be applied to the buffers 1312*c* and 1322*c*. The buffers 1312 and 1312*c* and the buffers 1322*b* and 1322*c* may be included in different level shifters 1310 and 1320. That is, buffers included in different level shifters 1310 and 1320 and for outputting same bits may be connected to a same bias transistor. The bias transistors (BT0*b*/BT0*c*) may limit a discharge current of the buffers 1312*b*, 1322*b*/1312*c*, and 1322*c* based on a voltage level of the bias control signal (IB1/IB0). That is, an output bias current of some bits HD[1] of decoded image data may be controlled by the same bias transistor BT2*b*. An output bias current of some bits HD[1] of decoded image data may be controlled by the same bias transistor BT2*c*. A bias transistor may not be connected to the buffers 1312*a* and 1322*a* that output the upper bits HD1 [2]B and HD2 [2]B.

Figure 14:
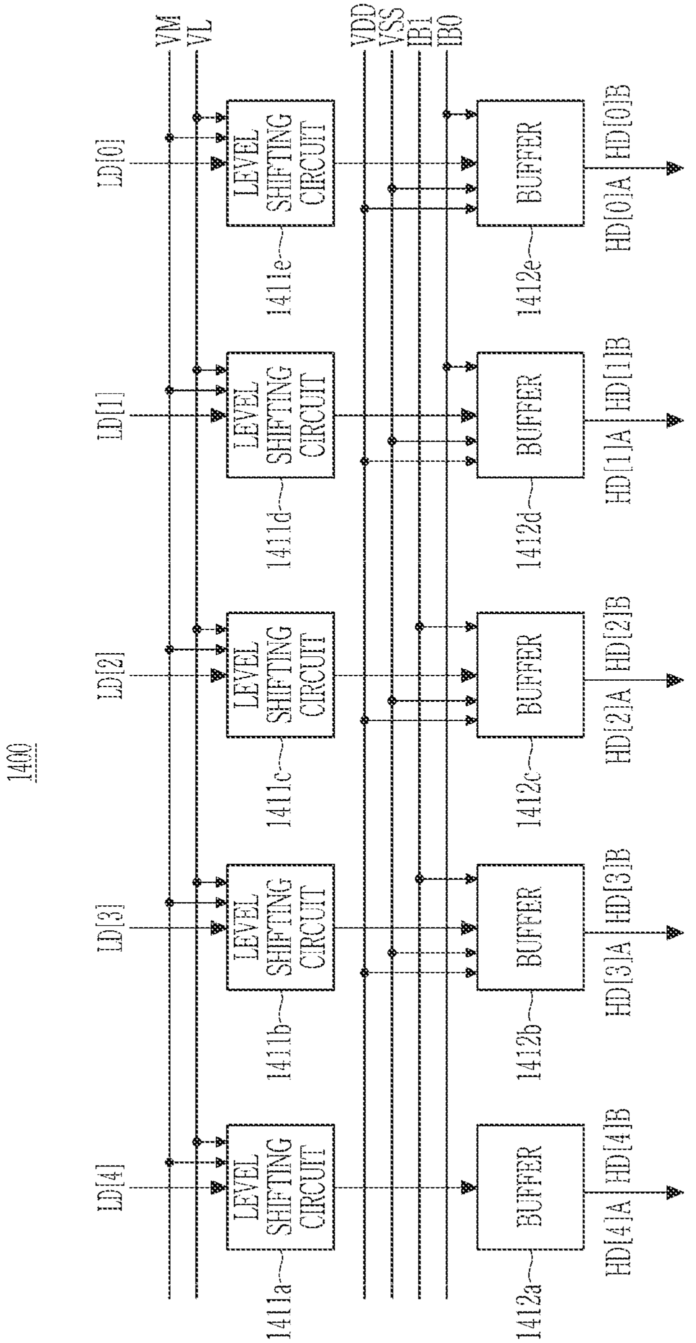
FIG. 14 illustrates a block diagram showing another example of a level shifter.

FIG. 14 illustrates a block diagram showing another example of a level shifter.

Referring to FIG. 14, the level shifter 1400 receives 5-bit image data LD[4:0]), and outputs 5-bit decoded image data HD[4:0]A and HD[4:0]B. The level shifter 1400 is connected to the DAC 220 (FIG. 2), and outputs decoded image data HD[4:0]A and HD[4:0]B to the DAC 220. A description of the level shifter 1400 that is the same or similar to the description of the level shifter 700 illustrated in FIG. 7 will be omitted.

In some implementations, a plurality of buffers 1412*a*, . . . , and 1412*e* may be grouped into a plurality of groups. The groups may include buffers that output adjacent bits. For example, the buffers 1412*b* and 1412*c* included in a first group may output bits HD[3:2]), and the buffers 1412*d* and 1412*e* included in a second group may output bits HD[1:0].

The different bias control signals IB1 and IB0 may be applied to the buffers 1412*b* and 1412*c* included in the first group and the buffers 1412*d* and 1412*e* included in the second group. The buffers 1412*b* and 1412*c* included in the first group may control an output bias current of some bits HD[3:2] of the decoded image data based on the same bias control signal IB0. The buffers 1412*d* and 1412*e* included in the second group may control an output bias current of some bits HD[1:0] of the decoded image data based on the same bias control signal IB0. For example, the bias control signal IB1 applied to the buffers 1412*b* and 1412*c* included in the first group corresponding to upper bits may have a higher voltage level than that of the bias control signal IB0 applied to the buffers 1412*d* and 1412*e* included in the second group corresponding to lower bits. Accordingly, an output bias current of the buffers 1412*b* and 1412*c* included in the first group may be greater than an output bias current of the buffers 1412*d* and 1412*e* included in the second group. The bias control signal IB1 and IB0 not be applied to the buffer 1412*a* that outputs the upper bit HD[4].

Figure 15:
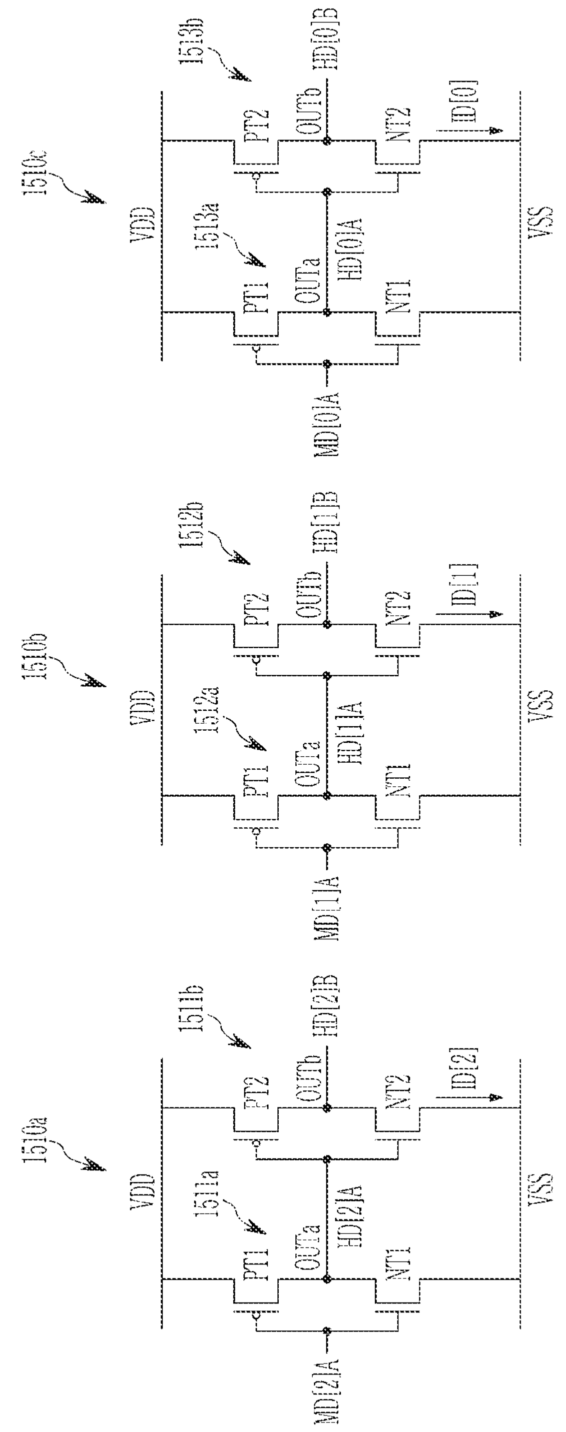
FIG. 15 illustrates a circuit diagram for recovery of another example of a level shifter.

FIG. 15 illustrates a circuit diagram for recovery of another example of a level shifter.

Referring to FIG. 15, a plurality of buffers 1510*a*, 1510*b*, and 1510*c* output decoded image data HD[2:0]A and HD[2:0]B. A description of the buffers 1510*a*, 1510*b*, and 1510*c* that are the same or similar to the description of the buffers 510*a*, 510*b*, and 510*c* illustrated in FIG. 5 will be omitted.

Each of the first stage inverters 1511*a*, 1512*a*, and 1513*a* may include transistors PT1 and NT1 connected in series between the third voltage VDD fourth voltage VSS.

The input terminal of the second stage inverter (1511*b*/1512*b*/1513*b*) may be connected to the output terminal OUTa of the first stage inverter (1511*a*/1512*a*/1513*a*). An output terminal OUTb of the second stage inverter (1511*b*/1512*b*/1513*b*) may be connected to a gate of a transistor of the N-type decoder (222*a*/222*b*/222*c*). Each of the second stage inverters 1511*b*, 1512*b*, and 1513*b* may include transistors PT2 and NT2 connected in series between the third voltage VDD and the fourth voltage VSS.

A size (W/L) of the transistors PT2 and NT2 included in the inverters 1512*b* and 1513*b* that output remaining bits may be smaller than a size (W/L) of the transistors PT2 and NT2 included in the inverter 1511*b* that outputs an upper bit. Accordingly, sizes of the discharge currents ID[1] and ID[0] may be smaller compared to the discharge current ID[2].

In addition, a size (W/L) of the transistors PT2 and NT2 included in the inverter 1513*b* that outputs a lower bit may be smaller than a size (W/L) of the transistors PT2 and NT2 included in the inverters 1511*b* and 1512*b* that output remaining bits. Accordingly, a size of the discharge current ID[0] of the inverter 1513*b* that outputs the lower bit ID[0] may be the smallest. Accordingly, ground bouncing due to a total discharge current of the second stage inverters 1511*b*, 1512*b*, and 1513*b* may be reduced. This may reduce an impact on the buffers 1510*a*, 1510*b*, and 1510*c* that receive the same fourth voltage VSS and a noise caused to an interface that is physically adjacent to the wire that supplies the fourth voltage VSS.

In some implementations, each of the inverters 1511*b*, 1512*b*, and 1513*b* may further include a bias transistor. Accordingly, the inverters 1511*b*, 1512*b*, and 1513*b* may control discharge currents ID[2:0] by a bias control signal in addition to the size (W/L) of the transistor.

Figure 16:
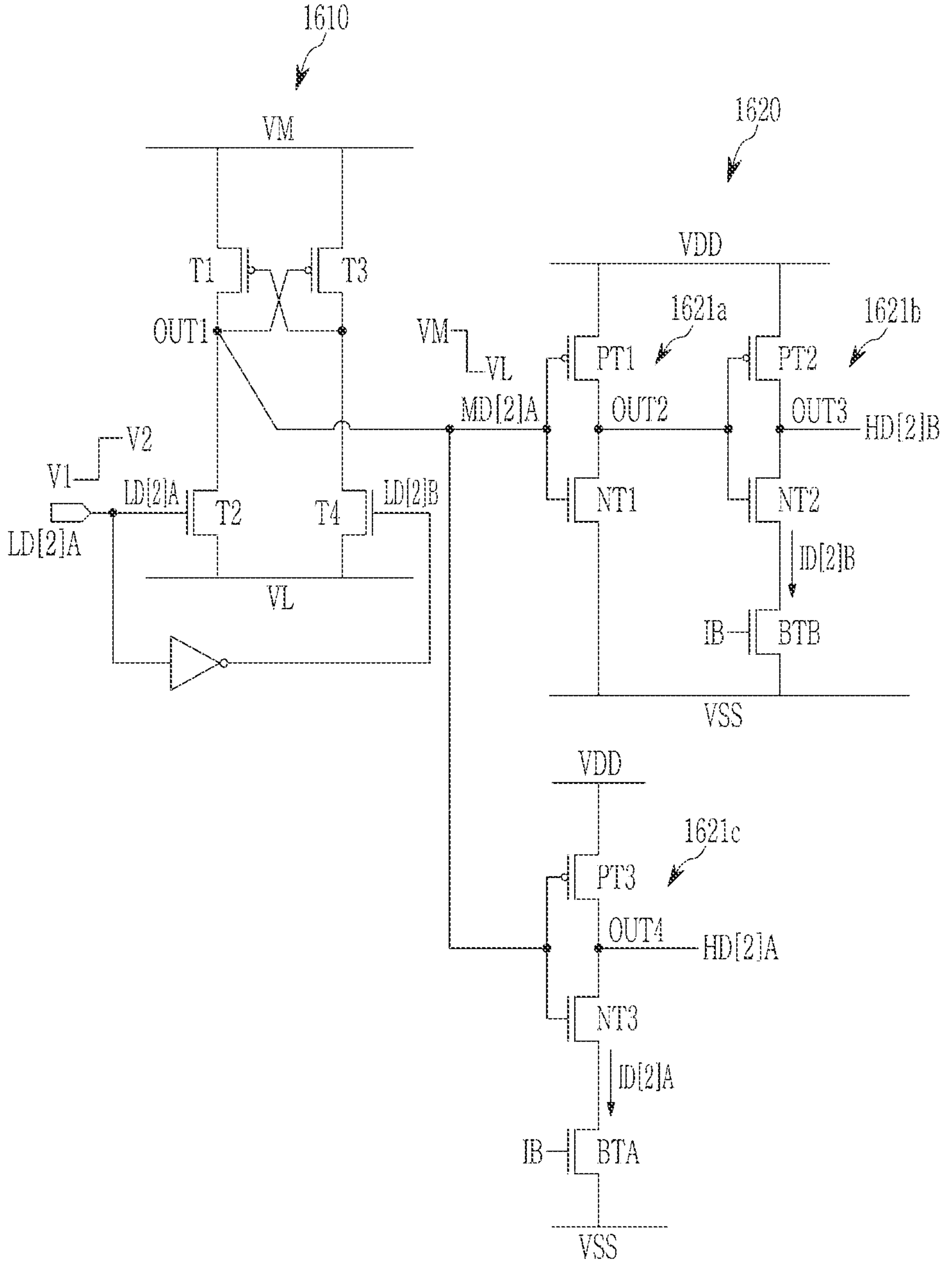
FIG. 16 illustrates a circuit diagram schematically showing a buffer and a level shifting circuit of another example of a source driver.

FIG. 16 illustrates a circuit diagram schematically showing a buffer and a level shifting circuit of another example of a source driver.

Referring to FIG. 16, the level shifting circuit 1610 includes a cross-coupled inverter, and the cross-coupled inverter includes transistors T1 and T2 connected in series between the first voltage VM and the second voltage VL, and transistors T3 and T4 connected in series between the first voltage VM and the second voltage VL. The buffer 1620 includes a two-stage inverter 1621*a* and 1621*b* and a single-stage inverter 1621*c*.

Descriptions of the level shifting circuit 1610 and buffer 1620 that are the same as or similar to those of the level shifting circuit 310 and the buffer 320 illustrated in FIG. 3 will be omitted.

The buffer 1620 may include 2-stage inverters 1621*a* and 321*b*. The first stage inverter 1621*a* may include transistors PT1 and NT1 connected in series between the third voltage VDD fourth voltage VSS. An input terminal of the first stage inverter 1621*a* may be connected to the output terminal OUT1 of the level shifting circuit 1610. A bit MD[2]A inverted and amplified by the level shifting circuit 1610 may be inputted to the input terminal of the first stage inverter 1621*a*. The bit in which the bit MD[2]A is inverted and the amplified may be outputted from the output terminal OUT2 of the first stage inverter 1621*a*.

The second stage inverter 1621*b* may include transistors PT2, NT2, and BTB connected in series between the third voltage VDD and the fourth voltage VSS. For example, the transistors PT2 and NT2 may be connected in an inverter structure, gates of transistors PT2 and NT2 may be connected to the output terminal OUT2 of the first stage inverter 1621*a*, and drains of transistors PT2 and NT2 may be connected to the output terminal OUT3. A bias transistor BTB may be connected between a source of the transistor NT2 and the fourth voltage VSS. The bit HD[2]A inverted and amplified by the first stage inverter 1621*a* may be inputted to the input terminal of the second stage inverter 1621*b*. The bit HD[2]A in which the bit HD[2]A is inverted and the amplified may be outputted from the output terminal OUT3 of the second stage inverter 1621*b*. An output terminal OUT3 may be connected to a gate of a transistor of the N-type decoder 222*a* included in the decoder 221*a* (FIG. 2). In some implementations, the bias transistor BTB may be positioned on a path that discharges an input capacitor of a transistor of the N-type decoder 222*a*

The bias control signal IB may be inputted to a gate of the bias transistor BTB. The bias transistor BTB may limit a discharge current ID[1]B based on a voltage level of the bias control signal IB.

The single-stage inverter 1621*c* may include transistors PT3, NT3, and BTA connected in series between the third voltage VDD and the fourth voltage VSS. For example, transistors PT3 and NT3 may be connected in an inverter structure, gates of transistors PT3 and NT3 may be connected to the output terminal OUT1, and drains of transistors PT3 and NT3 may be connected to an output terminal OUT4. A bias transistor BTA may be connected between a source of the transistor NT3 and the fourth voltage VSS. A bit MD[2]A inverted and amplified by the level shifting circuit 1610 may be inputted to the input terminal of the single-stage inverter 1621*c*. The bit HD[2]A in which the bit MD[2]A is inverted and the amplified may be outputted from the output terminal OUT4 of the single-stage inverter 1621*c*. An output terminal OUT4 may be connected to a gate of a transistor of the N-type decoder 222*a* included in the decoder 221*a*. In some implementations, the bias transistor BTA may be positioned on a path that discharges an input capacitor of a transistor of the P-type decoder 223*a*

The bias control signal IB may be inputted to a gate of the bias transistor BTA. The bias transistor BTA may limit a discharge current ID[1]A based on a voltage level of the bias control signal IB.

Implementations described with reference to FIG. 5 to FIG. 15 may be applied to the buffer 1620 of FIG. 16.

Figure 17:
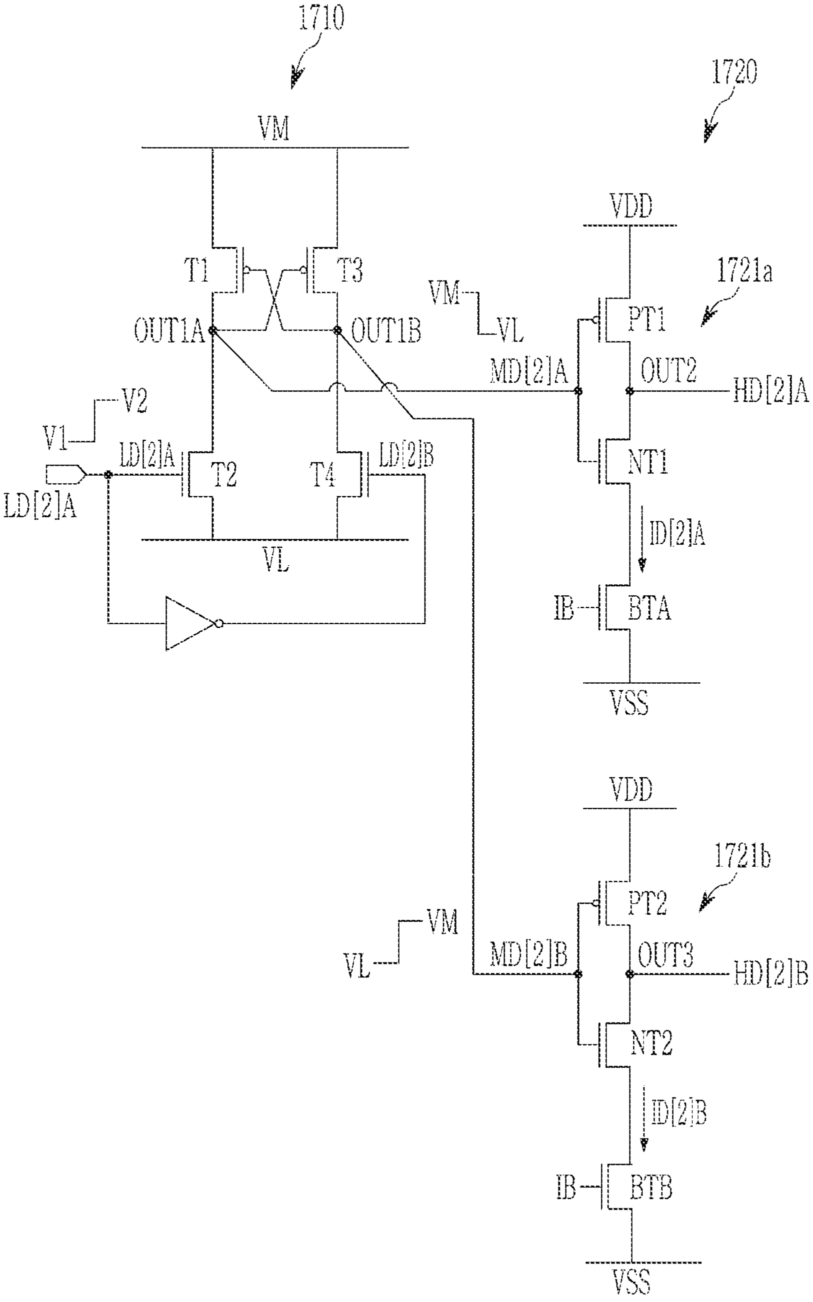
FIG. 17 illustrates a circuit diagram schematically showing a buffer and a level shifting circuit of another example of a source driver.

FIG. 17 illustrates a circuit diagram schematically showing a buffer and a level shifting circuit of another example of a source driver.

Referring to FIG. 17, the level shifting circuit 1710 includes a cross-coupled inverter, and the cross-coupled inverter includes transistors T1 and T2 connected in series between the first voltage VM and the second voltage VL, and transistors T3 and T4 connected in series between the first voltage VM and the second voltage VL. A buffer 1720 includes single-stage inverters 1721*a* and 1721*b*.

Descriptions of the level shifting circuit 1710 and buffer 1720 that are the same as or similar to those of the level shifting circuit 310 and the buffer 320 illustrated in FIG. 3 will be omitted.

A bit LD[2]A of image data may be provided to a gate of the transistor T2, and a bit LD[2]B in which the bit LD[2]A is inverted may be provided to a gate of the transistor T4. The bit LD[2]B in which the bit LD[2]A of the image data is inverted and amplified may be outputted from an output terminal OUT1A. The bit LD[2]B in which the bit LD[2]B of the image data is inverted and amplified may be outputted from an output terminal OUT1B.

A buffer 1720 may include single-stage inverters 1721*a* and 1721*b*. The first stage inverter 1721*a* may include transistors PT1, NT1, and BTA connected in series between the third voltage VDD and the fourth voltage VSS. For example, the transistors PT1 and NT1 may be connected in an inverter structure, gates of transistors PT1 and NT1 may be connected to the output terminal OUT1A, and drains of transistors PT1 and NT1 may be connected to an output terminal OUT2. A bias transistor BTA may be connected between a source of the transistor NT1 and the fourth voltage VSS. A bit MD[2]A inverted and amplified by the level shifting circuit 1710 may be inputted to the input terminal of the single-stage inverter 1721*a*. The bit HD[2]A in which the bit MD[2]A is inverted and the amplified may be outputted from the output terminal OUT2 of the single-stage inverter 1721*a*. An output terminal OUT2 may be connected to a gate of a transistor of the N-type decoder 222*a* included in the decoder 221*a* (FIG. 2). In some implementations, the bias transistor BTA may be positioned on a path that discharges an input capacitor of a transistor of the P-type decoder 223*a*

The bias control signal IB may be inputted to a gate of the bias transistor BTA. The bias transistor BTA may limit a discharge current ID[1]A based on a voltage level of the bias control signal IB.

The second inverter 1721*b* may include transistors PT2, NT2, and BTB connected in series between the third voltage VDD and the fourth voltage VSS. For example, the transistors PT2 and NT2 may be connected in an inverter structure, gates of transistors PT2 and NT2 may be connected to the output terminal OUT1B, and drains of transistors PT2 and NT2 may be connected to an output terminal OUT3. A bias transistor BTB may be connected between a source of the transistor NT2 and the fourth voltage VSS. A bit MD[2]B inverted and amplified by the level shifting circuit 1710 may be inputted to the input terminal of the second inverter 1721*b*. The bit MD[2]B in which the bit HD[2]A is inverted and the amplified may be outputted from the output terminal OUT3 of the second inverter 1721*b*. An output terminal OUT3 may be connected to a gate of a transistor of the N-type decoder 222*a* included in the decoder 221*a*. In some implementations, the bias transistor BTB may be positioned on a path that discharges an input capacitor of a transistor of the N-type decoder 222*a*

The bias control signal IB may be inputted to a gate of the bias transistor BTB. The bias transistor BTB may limit a discharge current ID[1]B based on a voltage level of the bias control signal IB.

Implementation described with reference to FIG. 5 to FIG. 15 may be applied to the buffer 1720 of FIG. 17.

Figure 18:
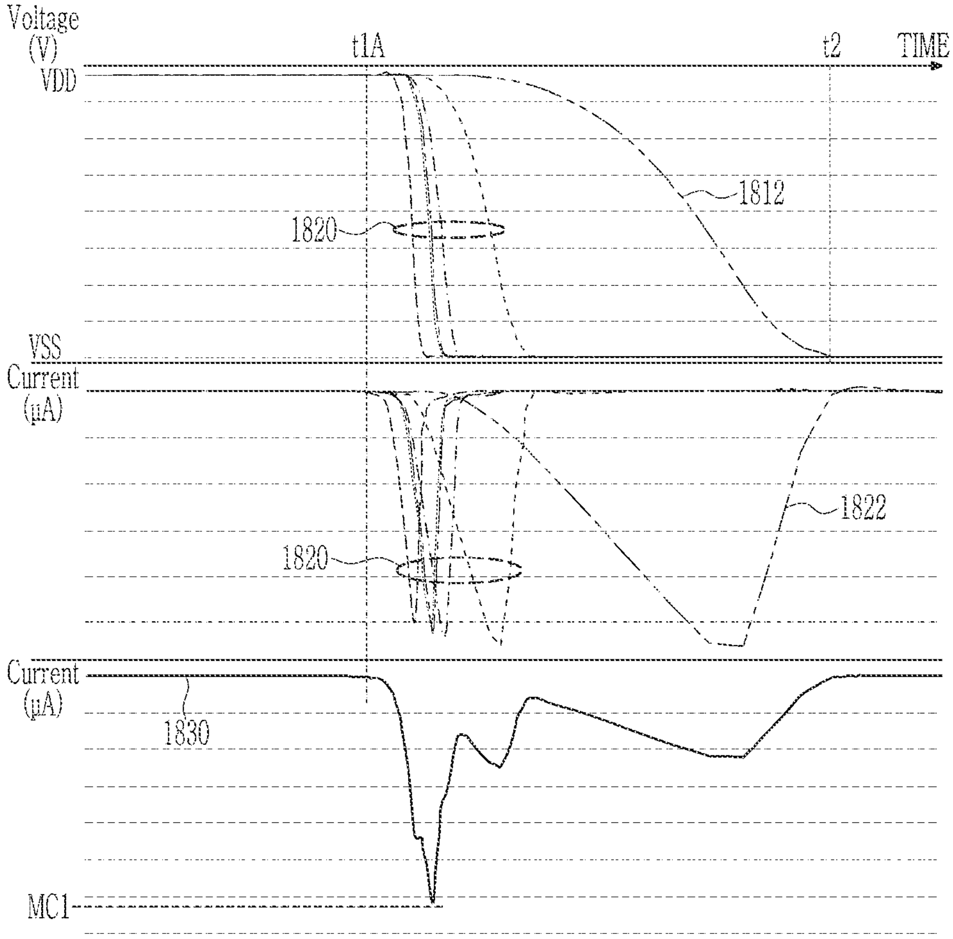
FIG. 18 illustrates a graph showing a simulation result of an output voltage and a discharging current of an example of a level shifter.
Figure 19:
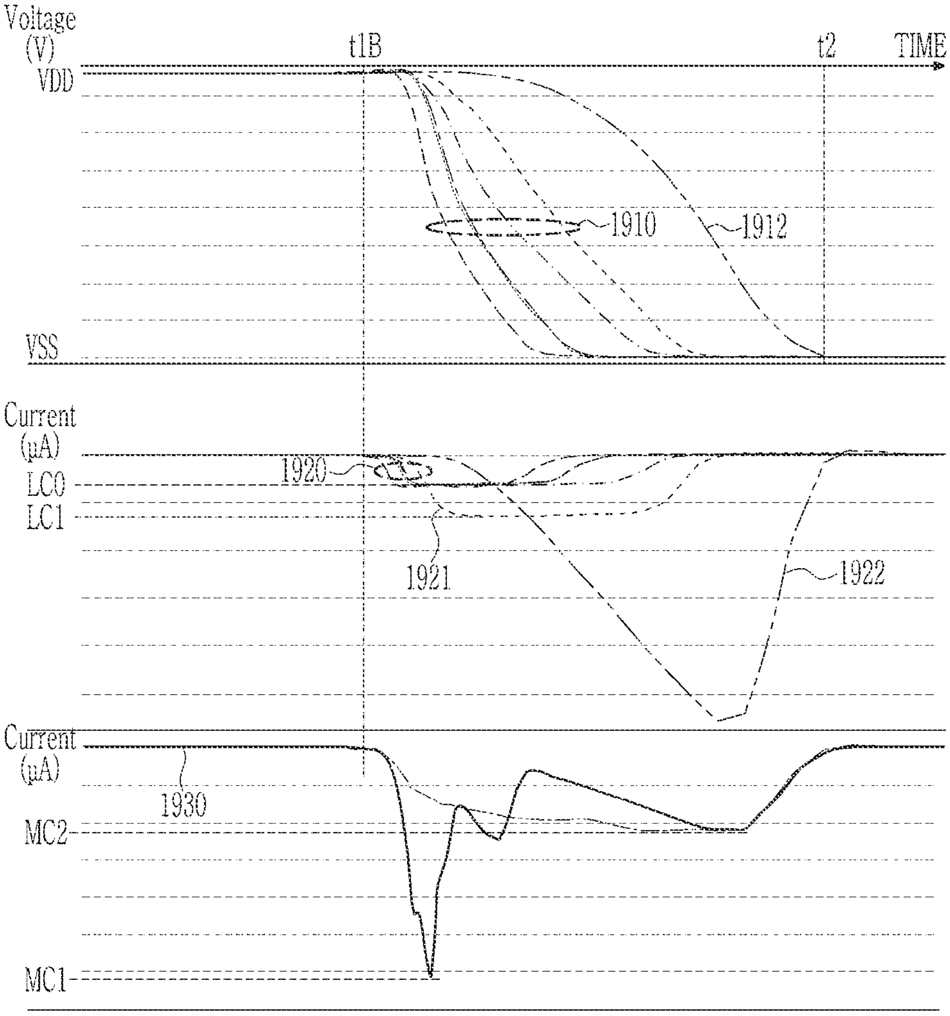
FIG. 19 illustrates a graph showing a simulation result of an output voltage and a discharging current of another example of a level shifter.

FIG. 18 illustrates a graph showing a simulation result of an output voltage and a discharging current of an example of a level shifter, and FIG. 19 illustrates a graph showing a simulation result of an output voltage and a discharging current of another example of a level shifter.

As illustrated in FIG. 18, bits 1810 and 1812 transition from the third voltage VDD to the fourth voltage VSS at a time point t1A. Transition of the uppermost bit 1812 is completed at a time point t2 after transition of the lower bits 1810 is completed.

The discharge current 1820 corresponding to the lower bits 1810 may have a maximum value at timings adjacent to each other while the transition of the lower bits 1810 is performed. Accordingly, a maximum value MC1 of a total discharge current 1830 may be formed while the lower bits 1810 are transitioning.

As illustrated in FIG. 19, bits 1910 and 1912 transition from the third voltage VDD to the fourth voltage VSS at a time point t1B. Transition of the uppermost bit 1912 is completed at a time point t2 after transition of the lower bits 1910 is completed.

Discharge currents 1920 and 1921 corresponding to the lower bits 1910 may be limited to different current amounts LC0 and LC1, respectively. The current amount is limited, and thus a slew rate of the bits 1910 may be lowered. In addition, a maximum value MC2 of a total discharge current 1930 flowing through the wire applying the fourth voltage VSS may be smaller than the maximum value MC1 by limiting amounts of discharge currents 1920 and 1921. Accordingly, in accordance with a display driving device, a source driver, and a display device including the same according to some implementations, ground bouncing due to the total discharge current 1930 may be reduced, and an impact of ground bouncing on adjacent circuits, modules, interfaces, etc. may be reduced.

Figure 20:
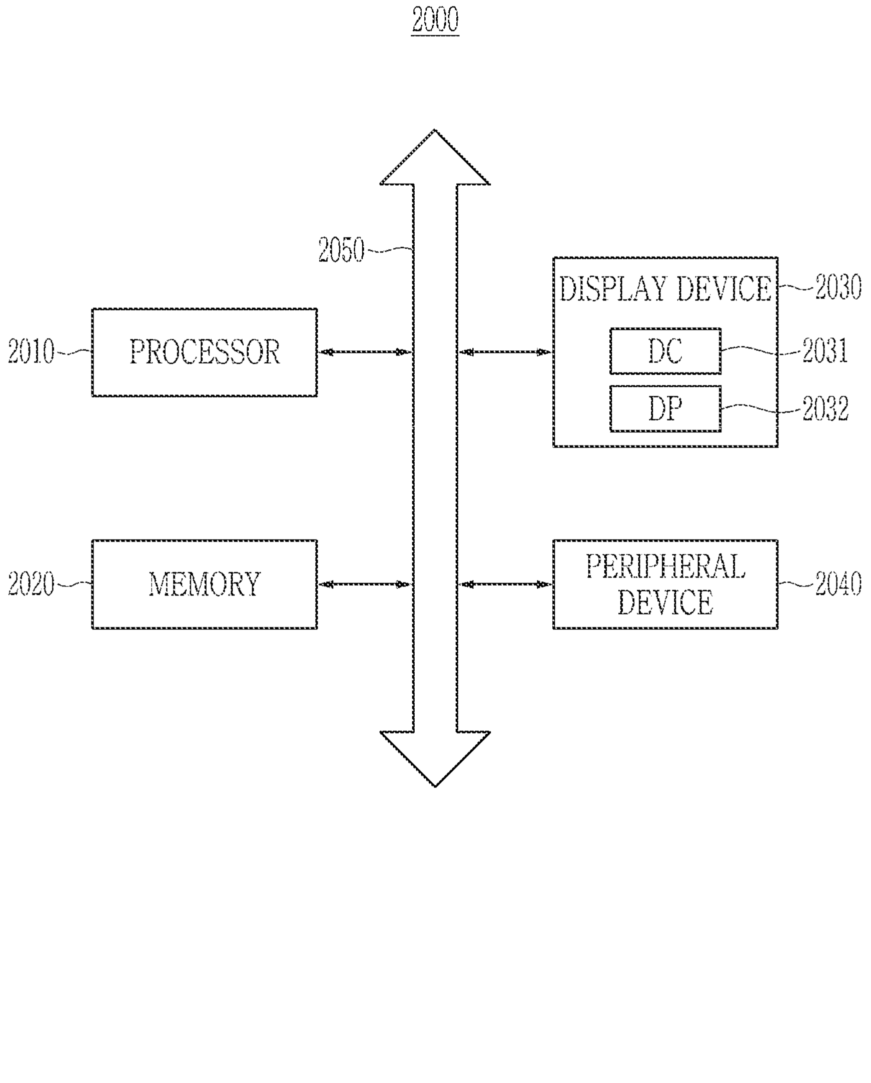
FIG. 20 illustrates a view for describing an example of a display system.

FIG. 20 illustrates a view for describing an example of a display system.

Referring to FIG. 20, the display system 2000 includes a processor 2010, a memory 2020, a display device 2030, and a peripheral device 2040, which are electrically connected to a system bus 2050.

The processor 2010 may control input and output of data of the memory 2020, the display device 2030, and the peripheral device 2040, and may perform image processing of image data transmitted between the corresponding devices.

The memory 2020 may include a volatile memory such as a dynamic random access memory (DRAM) and/or a non-volatile memory such as a flash memory. The memory 2020 may include a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (e.g., a memory in which a static random access memory (SRAM) buffer, a NAND flash memory, and a NOR interface logic are combined). The memory 2020 may store image data acquired from the peripheral device 2040 or an image signal processed by the processor 2010.

The display device 2030 may include a driving circuit 2031 and a display panel 2032, and the driving circuit 2031 may display image data applied through the system bus 2050 on the display panel 2032. The driving circuit 2031 may include a level shifter that levels-shifts image data to a higher voltage level to transfer it to the DAC. The level shifter according to some implementations may control a discharge current that discharges an input capacitor of the DAC. For example, the level shifter may limit a magnitude of the discharge current corresponding to bits excluding an upper bit. In some implementations, the level shifter may limit discharge currents to the same or different magnitudes. The level shifter may limit discharge currents discharging input capacitors of DACs connected to different source lines to a same amount.

The peripheral device 2040 may be a device that converts a motion picture or still image, such as for a camera, scanner, or webcam, into an electrical signal. The image data acquired through the peripheral device 2040 may be stored in the memory 2020 or may be displayed on the panel 2032 in real time.

The display system 2000 may be provided in a mobile electronic product such as a smart phone, but the present disclosure is not limited thereto, and may be provided in various types of electronic products that display images.

In some implementations, each component or combinations of two or more components described with reference to FIG. 1 to FIG. 20 may be implemented as a digital circuit, a programmable or non-programmable logic device or array, an application specific integrated circuit (ASIC), or the like.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While this disclosure has been described in connection with what is presently considered to be practical implementations, it is to be understood that the disclosure is not limited to the disclosed implementations, but, on the contrary, is intended to cover various modifications and equivalent dispositions included within the spirit and scope of the appended claims.

What is claimed is:

1. A display driving device comprising:
a level shifter configured to
receive image data and a bias control signal,
level-shift the image data to generate decoded image data, the decoded image data including a plurality of bits, the plurality of bits including an uppermost bit, and
control at least one output bias current of at least one bit of the plurality of bits excluding the uppermost bit of the decoded image data based on the bias control signal; and
a digital-to-analog converter (DAC) configured to
receive the decoded image data and a plurality of gamma voltages,
select one gamma voltage of the plurality of gamma voltages based on the decoded image data, and
output the selected gamma voltage.

2. The display driving device of claim 1, wherein the level shifter includes:
a plurality of level shifting circuits configured to
receive the image data, and
level-shift the image data using a first voltage and a second voltage that is different from the first voltage; and
a plurality of buffers configured to
receive the level-shifted image data, and
level-shift, using a third voltage and a fourth voltage, the level-shifted image data to generate the decoded image data, wherein the third voltage is higher than the first voltage and the fourth voltage is lower than the second voltage, and
wherein the bias control signal is transferred to at least one buffer of the plurality of buffers.

3. The display driving device of claim 2, wherein
the DAC includes a plurality of stages, the plurality of stages including a plurality of decoders, wherein a number of the plurality of decoders corresponds to the plurality of bits,
the plurality of buffers are connected with the plurality of stages, and
the bias control signal is transferred at a plurality of different voltage levels to the plurality of buffers according to the plurality of decoders included in the plurality of stages.

4. The display driving device of claim 3, wherein
the plurality of decoders included in the plurality of stages include at least one transistor including a gate through which the plurality of bits are inputted, and
wherein the output bias current is a current that discharges an input capacitor of the gate of the at least one transistor.

5. The display driving device of claim 3, wherein
the plurality of buffers include a first buffer that is connected with a stage including a first number of decoders, and a second buffer that is connected with a stage including a second number of decoders, the second number being smaller than the first number, and
the bias control signal is transferred to the first buffer and the second buffer at different levels to allow an output bias current of the first buffer to be greater than an output bias current of the second buffer.

6. The display driving device of claim 3, wherein
the bias control signal is transferred to at least one buffer connected with at least one stage to control an output bias current of the at least one stage, the at least one stage being not a stage including a largest number of decoders among the plurality of buffers.

7. The display driving device of claim 2, wherein at least one buffer of the plurality of buffers includes:
an inverter configured to receive the level-shifted image data and to output the decoded image data, and
a bias transistor configured to connect the inverter with the fourth voltage, the bias transistor including a gate that is configured to receive the bias control signal.

8. The display driving device of claim 7, wherein
at least two buffers among the plurality of buffers include the inverter and the bias transistor, and
wherein the bias transistor included in one of the at least two buffers has a different size than the bias transistor included in another of the at least two buffers.

9. The display driving device of claim 1, wherein
the level shifter is configured to, based on the bias control signal, control a plurality of output bias currents of the plurality of bits to have a same magnitude.

10. The display driving device of claim 1, wherein
the level shifter is configured to, based on the bias control signal, control a plurality of output bias currents of the plurality of bits to have different magnitudes.

11. The display driving device of claim 1, wherein
the level shifter is configured to, based on the bias control signal, control an output bias current of an upper bit among the plurality of bits to be lower than an output bias current of a lower bit among the plurality of bits.

12. The display driving device of claim 1, wherein
the level shifter is configured to, based on the bias control signal, control a plurality of output bias currents of a plurality of upper bits among the plurality of bits and a plurality of output bias currents of a plurality of lower bits among the plurality of bits to be different magnitudes.

13. The display driving device of claim 12, wherein
the level shifter is configured to control the plurality of output bias currents of the plurality of upper bits to be a same first magnitude and to control the plurality of output bias currents of the plurality of lower bits to be a same second magnitude.

14. The display driving device of claim 1, comprising a bias circuit configured to receive a bias start signal that is configured to control the bias control signal to be outputted at a first level, and generate the bias control signal at a second level that is different from the first level with reference to data stored in a one-time programmable (OTP) memory.

15. A source driver comprising:

a plurality of amplifier areas, each amplifier area of the plurality of amplifier areas including a level shifter configured to level-shift at least one bit of a plurality of bits of an image data to generate a decoded image data and output a plurality of bits of the decoded image data, the at least one bit being among the plurality of bits excluding an uppermost bit of the plurality of bits, a digital-to-analog converter (DAC) configured to select one gamma voltage of a plurality of gamma voltages based on the decoded image data, and an amplifier configured to amplify the selected gamma voltage to obtain a data signal and to output the data signal to a corresponding source line among a plurality of source lines; and a bias circuit configured to generate a bias control signal that is configured to limit an output bias current of the level shifter included in each of the plurality of amplifier areas.

16. The source driver of claim 15, wherein the bias control signal includes a first bias control signal and a second bias control signal, the first bias control signal is configured to limit an output bias current of a first bit among the plurality of bits outputted by the plurality of level shifters included in the plurality of amplifier areas, and the second bias control signal is configured to limit an output bias current of a second bit among the plurality of bits outputted by the plurality of level shifters included in the plurality of amplifier areas.

17. The source driver of claim 15, comprising a repeater area configured to connect the plurality of level shifters with a first voltage, the repeater area including a bias transistor, the bias transistor including a gate that is configured to receive the bias control signal, the repeater area positioned between the plurality of amplifier areas.

18. A display device comprising:

a pixel array including a plurality of pixels;

a timing controller configured to receive an image signal and a driving control signal from an outside of the display device, divide the image signal to generate a plurality of image data, and generate a bias start signal based on the driving control signal;

a plurality of amplifier areas configured to receive one image data of the plurality of image data and a bias control signal, level-shift at least one bit of a plurality of bits of the image data to generate decoded image data, the at least one bit being among the plurality of bits excluding an uppermost bit of the plurality of bits, control a level of an output bias current of the decoded image data based on a level of the bias control signal, receive the decoded image data and a plurality of gamma voltages, select one gamma voltage of the plurality of gamma voltages based on the decoded image data, and output the selected gamma voltage; and a bias circuit configured to receive a bias start signal that is configured to control the bias control signal to be outputted at a first level, and generate the bias control signal at a second level that is different from the first level with reference to data stored in a one-time programmable (OTP) memory.

19. The display device of claim 18, wherein the decoded image data includes a plurality of bits, and the bias circuit is configured to generate the bias control signal to allow a plurality of slew rates of the plurality of bits to be different.

* * * * *